US012812262B2

(12) United States Patent
Nitta et al.

(10) Patent No.: US 12,812,262 B2
(45) Date of Patent: Nov. 24, 2026

(54) IMAGING APPARATUS AND IMAGING METHOD

(71) Applicant: OMNIVISION TECHNOLOGIES, INC., Santa Clara, CA (US)

(72) Inventors: Yoshikazu Nitta, Kanagawa (JP); Yusuke Oguro, Kanagawa (JP)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 19/282,050

(22) Filed: Jul. 28, 2025

(65) Prior Publication Data

US 2026/0156377 A1 Jun. 4, 2026

(30) Foreign Application Priority Data

Nov. 29, 2024 (JP) ................................ 2024-208407

(51) Int. Cl.

| | |
|---|---|
| ***H04N 25/46*** | (2023.01) |
| ***G02B 27/00*** | (2006.01) |
| ***H04N 25/13*** | (2023.01) |
| ***H04N 25/47*** | (2023.01) |

(52) U.S. Cl.

CPC ........... *H04N 25/46* (2023.01); *H04N 25/135* (2023.01); *H04N 25/47* (2023.01); *G02B 27/0093* (2013.01)

(58) Field of Classification Search

CPC ...... H04N 25/46; H04N 25/47; H04N 25/135; G02B 27/0093

USPC .......................................................... 348/294

See application file for complete search history.

(56) References Cited

U.S. PATENT DOCUMENTS

| | | | | |
|---|---|---|---|---|
| 2023/0156353 A1* | 5/2023 | Jang | ..................... | G06V 10/761 348/302 |
| 2024/0323564 A1* | 9/2024 | Chen | ..................... | H04N 25/131 |

OTHER PUBLICATIONS

Grosche et al.; "Image Super-Resolution Using T-Teromino Pixels;" 2023 IEEE/CVF Conference on Computer Vision and Pattern Recognition (CVPR); downloaded on Jun. 3, 2025; pp. 9989-9998; IEEE.

Seiler et al.; "Increasing Imaging Resolution by Non-Regular Sampling and Joint Sparse Deconvolution and Extrapolation;" IEEE Transactions on Circuits and Systems for Video Technology; Feb. 2019; pp. 308-322; vol. 29; No. 2; IEEE.

* cited by examiner

*Primary Examiner* — Joel W Fosselman

(74) *Attorney, Agent, or Firm* — Christensen O'Connor Johnson Kindness PLLC

(57) ABSTRACT

A binning processor executes a (k×k) binning process wherein k is an integer. The binning processor is further capable of executing a uniform binning process. In the uniform binning process, a signal from at least one pixel of each color, disposed relatively closer to a center side of a pixel group, is excluded from a processing target.

10 Claims, 25 Drawing Sheets

IMAGING APPARATUS AND IMAGING METHOD

CROSS REFERENCE TO RELATED APPLICATION

This application claims priority to Japanese Patent Application No. 2024-208407 filed on Nov. 29, 2024, which is incorporated herein by reference in its entirety including the specification, claims, drawings, and abstract.

TECHNICAL FIELD

The present disclosure relates to an imaging apparatus and an imaging method.

BACKGROUND

For example, as described in Simon Grosche, Andy Regenski, Jürgen Seiler, and André Kaup, "Image Super-Resolution Using T-Tetromino Pixels", Proceedings of IEEE/CVF Conference on Computer Vision and Pattern Recognition (CVPR), 2023, pp. 9989-9998, and Jürgen Seiler, Markus Jonscher, Thomas Ussmueller, and André Kaup, "Increasing Imaging Resolution by Non-Regular Sampling and Joint Sparse Deconvolution and Extrapolation", IEEE Transactions on Circuits and Systems for Video Technology, February 2019, vol. 29, no. 2, pp. 308-322, a binning process is known as a method of processing an image. In the binning process, values of a plurality of pixels of an image sensor are summed or averaged. For example, values of pixels of the same color are summed or averaged.

With the plurality of pixels being collected as one unit, resolution of the image is reduced. On the other hand, with the summation of the pixel values, brightness is increased. Further, with the averaging, noise is reduced. That is, by regarding a plurality of pixels as one large pixel, a light-receiving area can be enlarged and sensitivity can be improved. Based on these advantages, the binning process is executed, for example, when the imaging environment is dark.

FIGS. 23 and 24 exemplify a binning process of the related art. FIG. 23 exemplifies a binning process for Gb pixels and B pixels. FIG. 24 exemplifies a binning process for R pixels and Gr pixels. The "Gb pixel" refers to a pixel disposed under a Gb color filter. Similarly, the B pixel, the R pixel, and the Gr pixel respectively refer to pixels under a B filter, an R filter, and a Gr filter.

FIGS. 23 and 24 exemplify a (2×2) binning process. Values of four pixels of the same color which are adjacent to each other are summed or averaged. Here, the pixel value after the binning process is, as shown by a white-filled circle mark, a value at a center of gravity (geometric center of gravity) of the four pixels on the light-receiving surface.

FIG. 25 conceptually exemplifies a pixel placement after the binning. With the (2×2) binning process, the respective pixel size is theoretically equivalent to enlargement of two times vertically and laterally, in comparison to the pixel size in FIGS. 23 and 24. FIG. 25 shows a center of gravity (geometric center) for the expanded pixel with a white-filled circle mark.

For example, for a pixel group formed from R, Gb, Gr, and B pixels, distances d1 and d3 between centers of gravity within a group are shorter in comparison with distances d2 and d4 between adjacent pixel groups. Due to such an uneven placement of the centers of gravity, an artifact may occur in the image after the binning process.

The present disclosure discloses an imaging apparatus and an imaging method in which the unevenness of the center of gravity of the pixel after the binning process can be suppressed in comparison with the related art.

SUMMARY

According to one aspect of the present disclosure, there is provided an imaging apparatus comprising a pixel array, a color filter array, and a binning processor. In the pixel array, a plurality of pixels are two-dimensionally arranged. The color filter array is disposed over the pixel array. In the color filter array, R color filters, G color filters, and B color filters are arranged in Bayer arrangement. The binning processor executes a (k×k) binning process, wherein k is an integer. That is, the binning processor executes the binning process treating k pixels in a vertical direction and k pixels in a horizontal direction in the pixel array as one pixel group. The binning processor is capable of executing a uniform binning process. In the uniform binning process, a signal from at least one pixel of each color, disposed relatively closer to a center side of the pixel group, is excluded from a processing target.

According to the above-described structure, with the uniform binning process, as shown in FIG. 6 to be described later, the distance between centers of gravity of pixels after the binning process is made more uniform in comparison with the related art.

In the above-described structure, the binning processor may be capable of switching between a normal binning process which uses signals from all of the pixels of the pixel group, and the uniform binning process.

According to the above-described structure, the normal binning process is chosen when brightness of the pixel and reduction of noise after the binning process are of importance. Further, the uniform binning process is chosen when reduction of the artifact is of importance. As described, according to the above-described structure, a binning process according to demanded advantages for the image can be performed.

In the above-described structure, the binning processor may execute a (2×2) binning process. In this case, two row selection lines are provided with respect to one row of the pixel array. In addition, a connection destination of the plurality of pixels of the pixel array may be switched between one of the row selection lines and the other of the row selection lines every two pixels along a row direction.

According to the above-described structure, the uniform binning process can be executed on an analog circuit.

In the above-described structure, four column signal lines may be provided with respect to one column of the pixel array. In this case, in the color filter array, color filters of two colors may be alternately arranged along a column direction. In addition, the column signal line may be assigned to each color of the color filters of two colors. Further, for a pair of pixel groups along the column direction, the column signal line connected to one of the pair of pixel groups and the column signal line connected to the other of the pair of pixel groups may differ from each other.

According to the above-described structure, pixel signals can be captured from a pair of pixel groups along the column direction simultaneously and in parallel with each other.

In the above-described structure, during a video image capturing, the binning processor may two-dimensionally shift the plurality of pixels to be grouped between the pixel group in a predetermined frame and the pixel group in a subsequent frame.

According to the above-described structure, a position of the artifact which occurs in the predetermined frame and a position of the artifact which occurs in the subsequent frame are deviated from each other. With this configuration, the artifact can be visually lessened when the video image is displayed.

In the above-described structure, the imaging apparatus may have a display and a tracking mechanism. An image by the pixel array may be displayed on the display. The eye tracking mechanism may measure a line of sight directed to the display. The binning processor may execute the binning process with respect to a region outside of a point of gaze of the line of sight.

According to the above-described structure, an image process based on so-called foveated rendering is executed, and calculation load of the image process can be reduced.

According to another aspect of the present disclosure, there is provided an imaging method. The imaging method is executed in an imaging apparatus. The imaging apparatus comprises a pixel array and a color filter array. In the pixel array, a plurality of pixels are two-dimensionally arranged. The color filter array is disposed over the pixel array. In the color filter array, R color filters, G color filters, and B color filters are arranged in Bayer arrangement. In the imaging apparatus, (k×k) binning process is executed, wherein k is an integer. That is, a binning process is executed treating k pixels in a vertical direction and k pixels in a horizontal direction in the pixel array as one pixel group. As the binning process, a uniform binning process is executed in which a signal from at least one pixel of each color, disposed relatively closer to a center side of the pixel group, is excluded from a processing target.

In the above-described structure, the binning process may be switchable between a normal binning process which uses signals from all of the pixels of the pixel group, and the uniform binning process.

In the above-described structure, during capturing of a video image, the plurality of pixels to be grouped may be two-dimensionally shifted between the pixel group in a predetermined frame and the pixel group in a subsequent frame.

In the above-described structure, the imaging apparatus may have a display and a tracking mechanism. An image by the pixel array is displayed on the display. The eye tracking mechanism may measure a line of sight directed to the display. The binning process may be executed with respect to a region outside of a point of gaze of the line of sight.

According to the imaging apparatus and the imaging method of the present disclosure, unevenness of the centers of gravity of the pixels after the binning process can be suppressed in comparison with the related art.

BRIEF DESCRIPTION OF DRAWINGS

Embodiment(s) of the present disclosure will be described based on the following figures, wherein.

DESCRIPTION OF EMBODIMENTS

Figure 1:
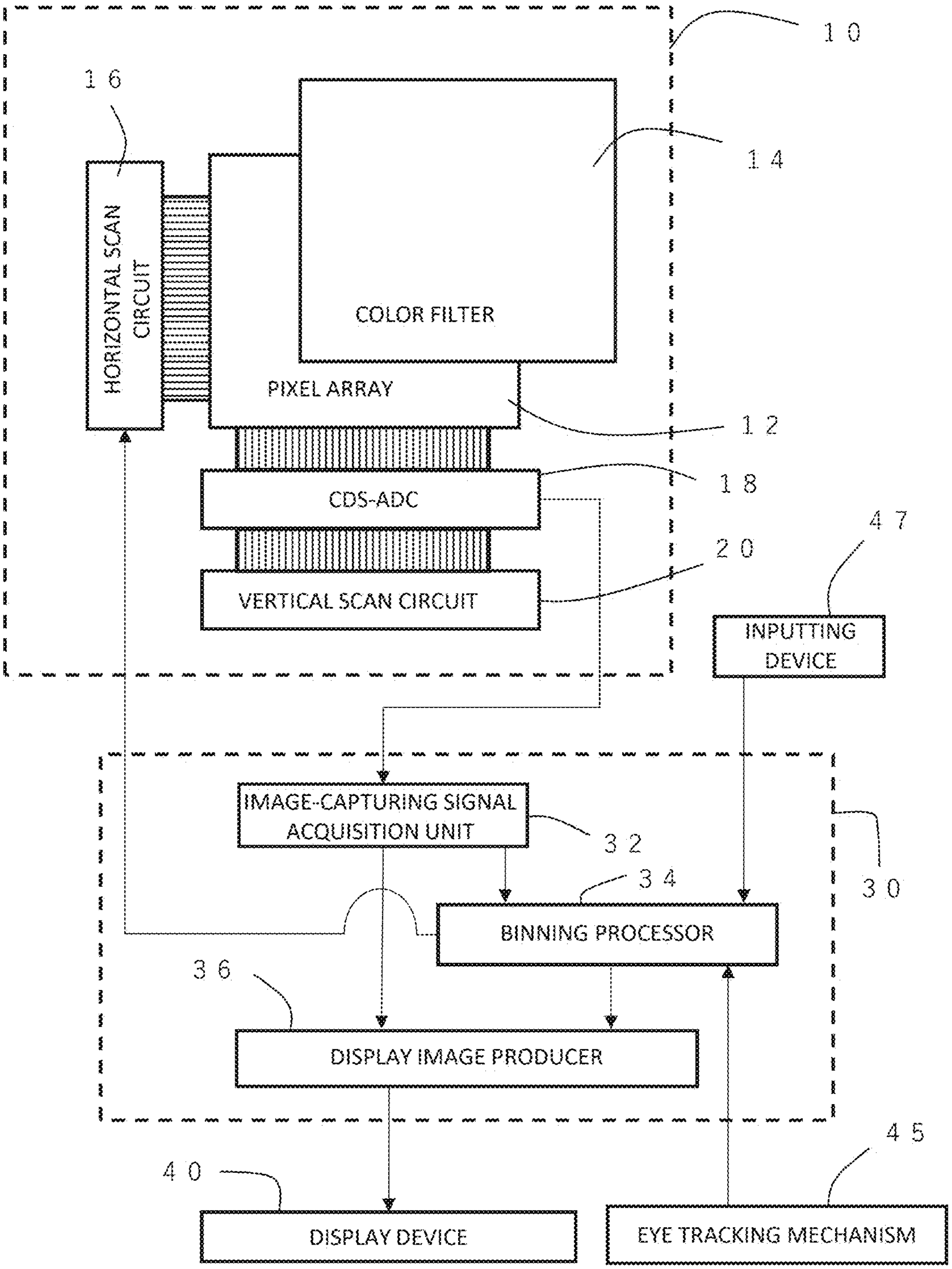
FIG. 1 is a diagram exemplifying an imaging system according to an embodiment of the present disclosure.

An imaging apparatus and an imaging method according to an embodiment of the present disclosure will now be described with reference to the drawings. Shapes, materials, numbers, and numerical values described below are merely exemplary for the purpose of description. These shapes and the like can be suitably changed according to a specification of the imaging apparatus. In addition, in the following, similar constituent elements over all drawings are assigned the same reference numerals.

1. Structure of Imaging System

FIG. 1 shows an imaging system according to an embodiment of the present disclosure. The system includes an imaging unit 10, an image processor 30, a display device 40, an eye tracking mechanism 45, and an inputting device 47.

An imaging apparatus according to an embodiment of the present disclosure includes the imaging unit 10 and the image processor 30.

The imaging unit 10 includes a pixel array 12, a color filter array 14, a horizontal scan circuit 16, a CDS-ADC circuit 18, and a vertical scan circuit 20. For example, the imaging unit 10 is a CMOS image sensor.

Figure 10:
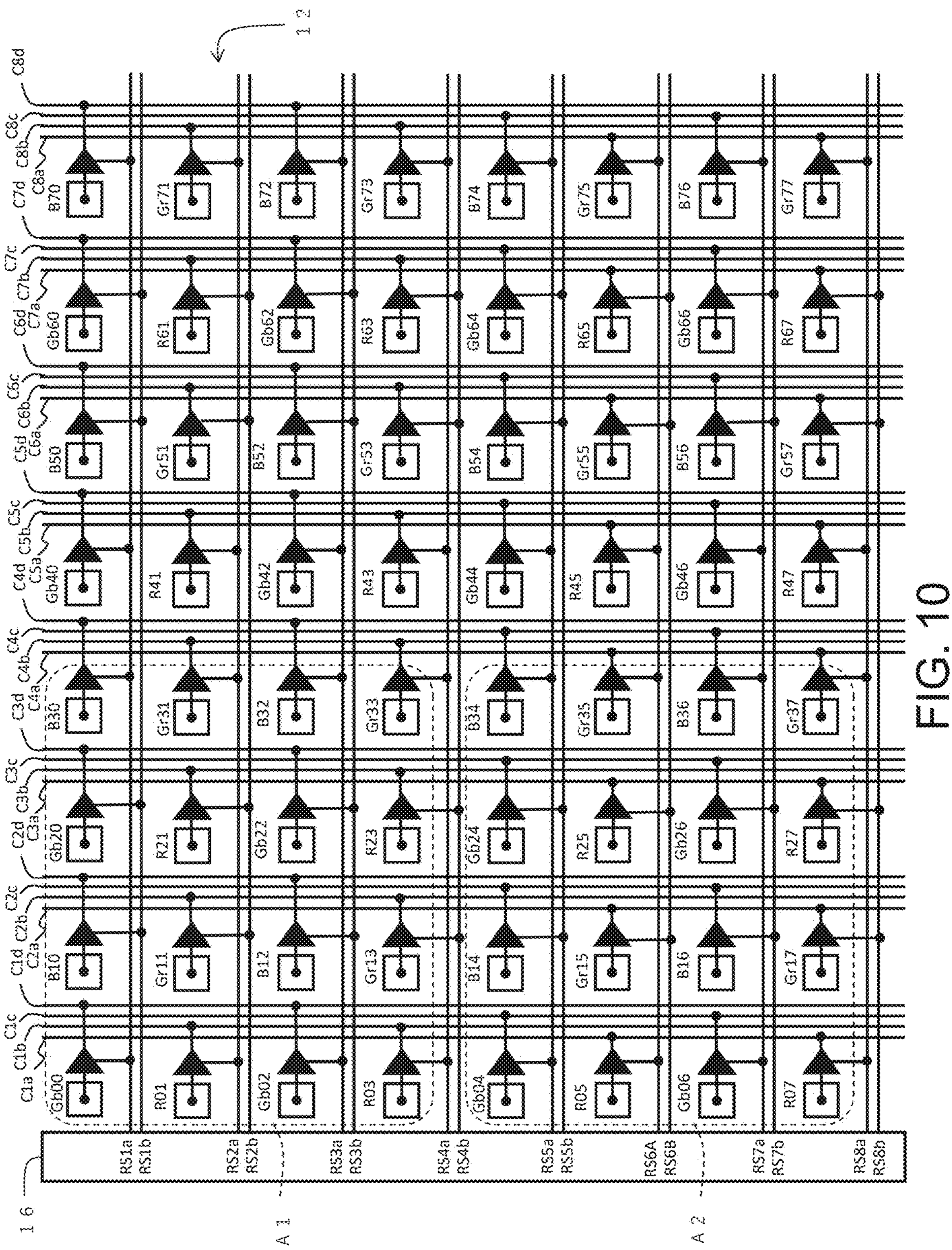
FIG. 10 is a diagram exemplifying a structure of a pixel array according to an embodiment of the present disclosure.

In the pixel array 12, a plurality of pixels are two-dimensionally arranged. For example, the plurality of pixels are arranged in a row direction and in a column direction, as shown in FIG. 10 to be described later.

The color filter array 14 is disposed over the pixel array 12. In the color filter array 14, R color filters, G color filters, and B color filters are two-dimensionally arranged. For example, in the color filter array 14, the R, G, and B color filters are two-dimensionally arranged according to Bayer arrangement.

Figure 2:
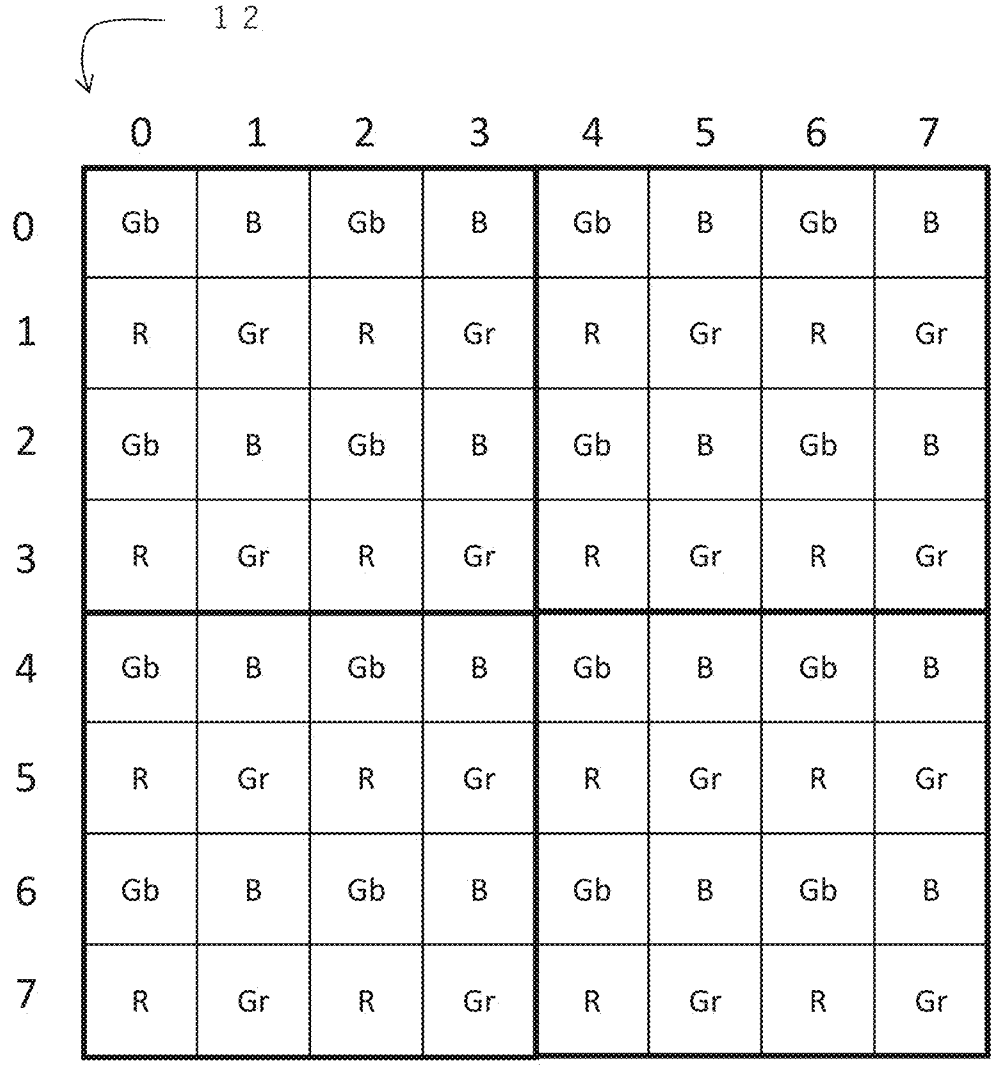
FIG. 2 is a diagram exemplifying a pixel arrangement based on Bayer arrangement.

FIG. 2 explains an arrangement of the color filter array 14 according to the Bayer arrangement. Green (Gb) in a blue (B) row and green (Gr) in a red (R) row are shown with different reference numerals for convenience of illustration. Strictly speaking, FIG. 2 does not show the color filter array 14 itself, but rather, shows a pixel arrangement under the color filter array 14, arranged in the Bayer arrangement. For example, a pixel at a coordinate (0, 0) outputs a signal of Gb (pixel value).

The horizontal scan circuit 16 is a circuit for selecting a read-out row of the pixel array 12. As shown in FIG. 10 to be described later, row selection lines RS (RS1*a* to RS4*a*, RS1*b* to RS4*b*) extend from the horizontal scan circuit 16 into the pixel array 12.

The CDS-ADC circuit 18 executes holding of a signal (voltage value) of each pixel of the pixel array 12, and analog-to-digital conversion (A/D conversion) of the pixel. As mechanisms for holding and A/D converting the signal is known, these mechanisms will not be described herein.

The vertical scan circuit 20 commands the CDS-ADC circuit 18 as to what column of the pixel array 12 is to be read out.

The image processor 30 includes an image-capturing signal acquisition unit 32, a binning processor 34, and a display image producer 36. The image processor 30 is formed from, for example, a computer. That is, these functional units are formed by cooperation of a CPU and a memory of the computer.

The image-capturing signal acquisition unit 32 acquires a digitally-converted pixel value from the CDS-ADC circuit 18. The pixel value acquired by the image-capturing signal acquisition unit 32 is sent to the binning processor 34 and the display image producer 36. For example, as will be described below, a value of a region having a pixel value lower than a predetermined threshold is sent to the binning processor 34. A value of a region having a pixel value greater than or equal to the predetermined threshold is sent to the display image producer 36. Details of the binning process will be described later.

To the display image producer 36, a pixel value after the binning process, and a pixel value of each pixel of the pixel array 12 are sent. The display image producer 36 produces image data from these pixel values. The produced image data is sent to the display device 40. An image is then displayed on the display device 40.

The eye tracking mechanism 45 is provided in the imaging system for executing foveated rendering to be described later. The eye tracking mechanism 45 detects, for example, a line of sight of a user viewing an image displayed on the display device 40.

Figure 23:
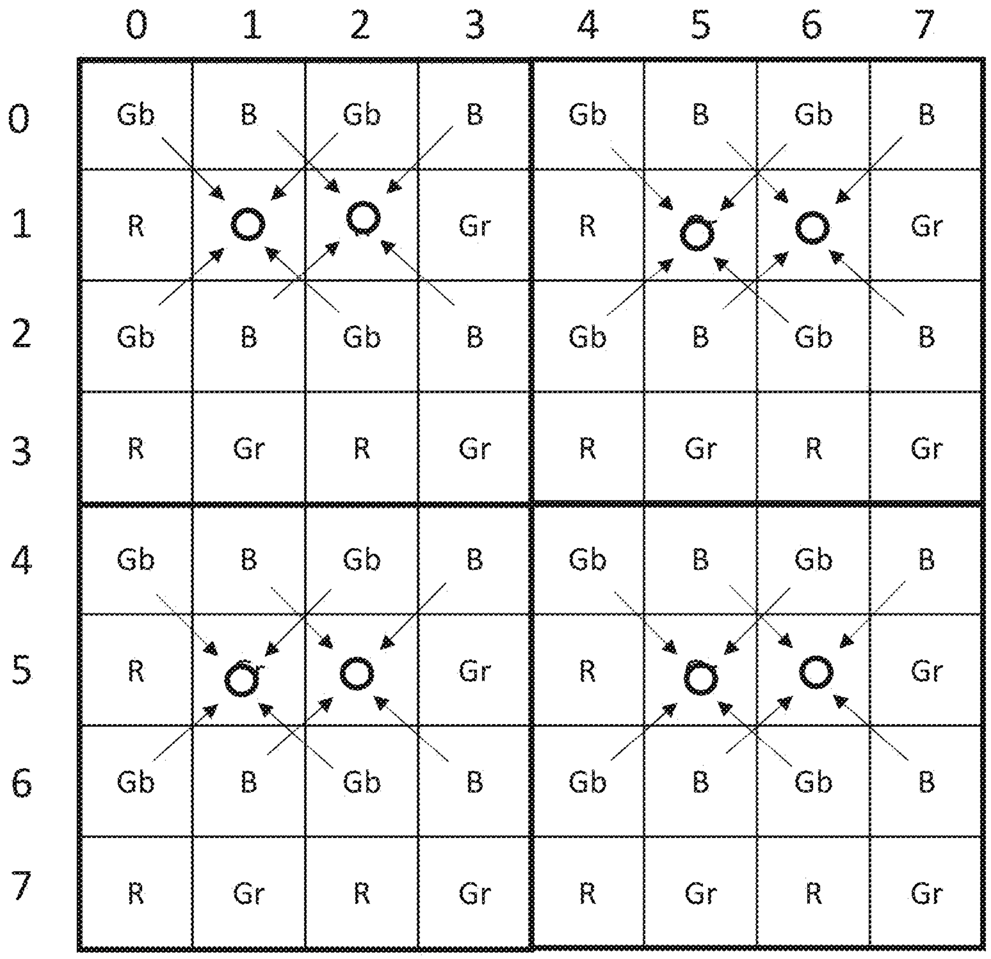
FIG. 23 is a diagram for explaining a binning process according to the related art (1/3)
Figure 24:
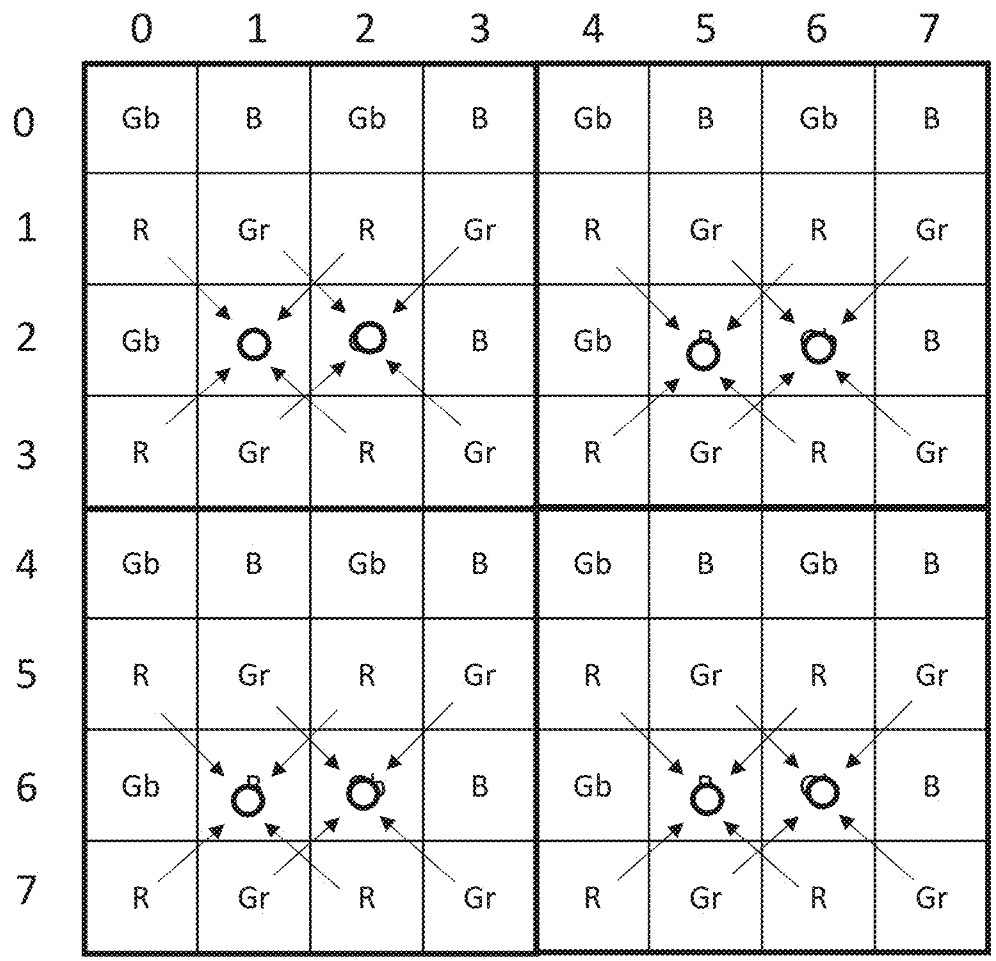
FIG. 24 is a diagram for explaining the binning process according to the related art (2/3)

The inputting device 47 is a user interface such as a touch panel, a keyboard, and a mouse. As will be described later, the user can select a uniform binning process (FIGS. 3 to 6), or a normal binning process (FIGS. 23 to 25) though manipulation of the inputting device 47. In other words, the binning processor 34 is capable of switching the binning process between the normal binning process and the uniform binning process through the manipulation of the inputting device 47.

2. Principle of Uniform Binning

FIG. 2 exemplifies a part of the pixel array 12. In order to specify a pixel, numbers are assigned in the row direction and in the lateral direction. For example, as in the X-Y coordinate, a pixel position at an upper left corner is represented as (0, 0); that is, 0th row and 0th column. In addition, FIG. 2 shows an arrangement of pixels which output signals of respective colors of R, G, and B.

In general, binning refers to an image process for reducing resolution for a clearer image when the imaging environment is dark. For example, in the binning process, a (k×k) binning process is executed (wherein k is an integer). That is, k pixels in a vertical direction and k pixels in a horizontal direction are collected as one pixel group. The binning process is executed by the binning processor 34 of the image processor 30 (refer to FIG. 1).

For example, in FIGS. 2 to 6, a (2×2) binning process is shown (k=2). In the (2×2) binning process, for example, for the Gb pixels, four pixels; that is, pixels of (0, 0), (2, 0), (0, 2), and (2, 2) are collected as one pixel group.

In the collected pixel group, averaging or summation is executed for the pixel values. With the averaging, noise can be reduced (variation is smoothened). With the summation, the pixel value (luminance) in the pixel is increased.

The binning processor 34 in the present embodiment can execute a uniform binning process. In the uniform binning process, as exemplified in FIG. 6, centers of gravity of the pixels after the binning (G_Gb1 to G_Gb4, G_B1 to G_B4, G_Gr1 to G_Gr4, G_R1 to G_R4) are geometrically more uniformly distributed in comparison with the case of the normal binning process of the related art (refer to FIG. 25).

FIGS. 3 to 6 exemplifies a (2×2) uniform binning process. The uniform binning process is executed by the binning processor 34 (refer to FIG. 1). In the (2×2) binning process, for the colors of Gb, B, Gr, and R, respectively, four types of pixels are taken as processing targets. In the following, for the convenience of illustration, Gb and Gr are explained as different colors (or different types).

Figure 3:
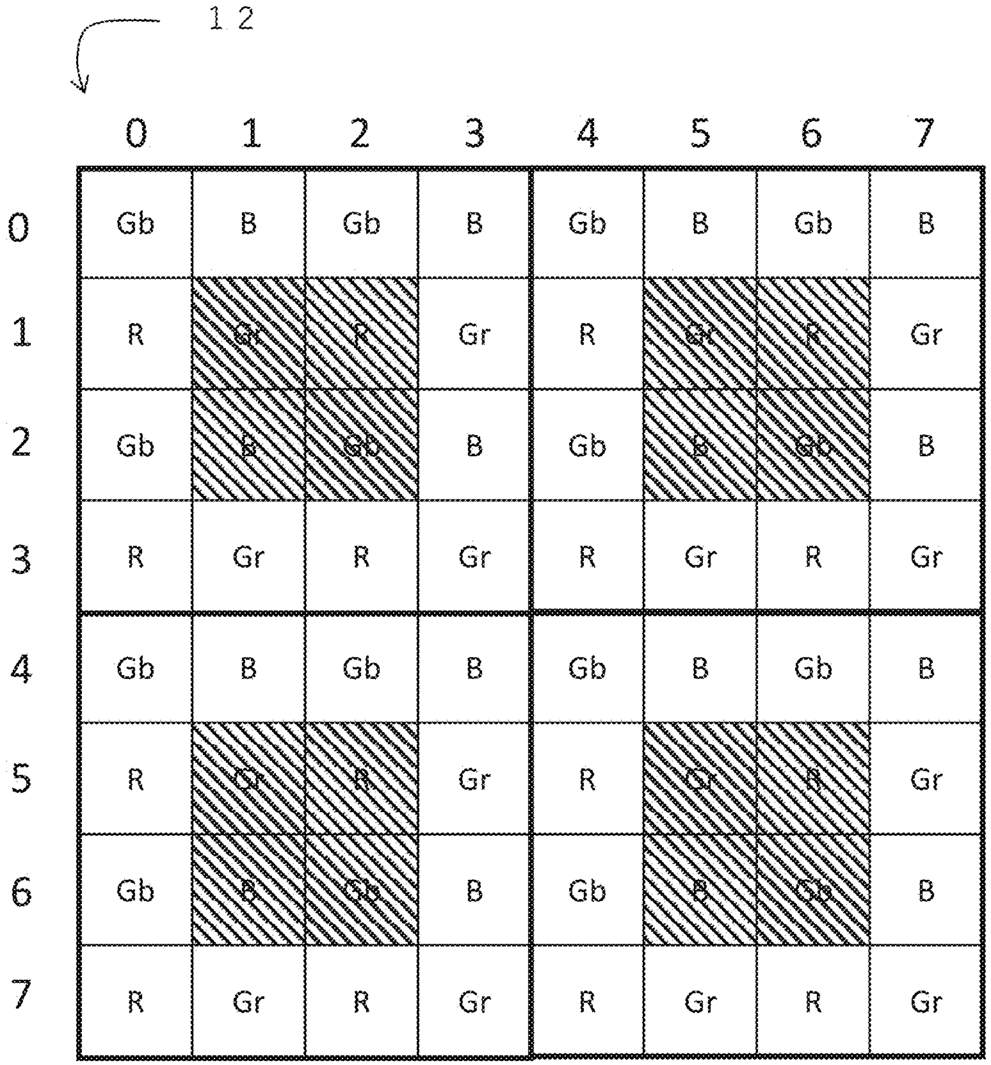
FIG. 3 is a diagram for explaining a uniform binning process (1/4)

Referring to FIG. 2, with the (2×2) binning process, 64 pixels are grouped into four pixel groups. A pixel group is shown by a quadrangle with a thick line. Referring to FIG. 3, in the uniform binning process, the binning processor 34 executes the binning process in a state in which a signal from at least one pixel of each color, disposed relatively closer to a center side of the pixel group, is excluded from the processing target.

Figure 4:
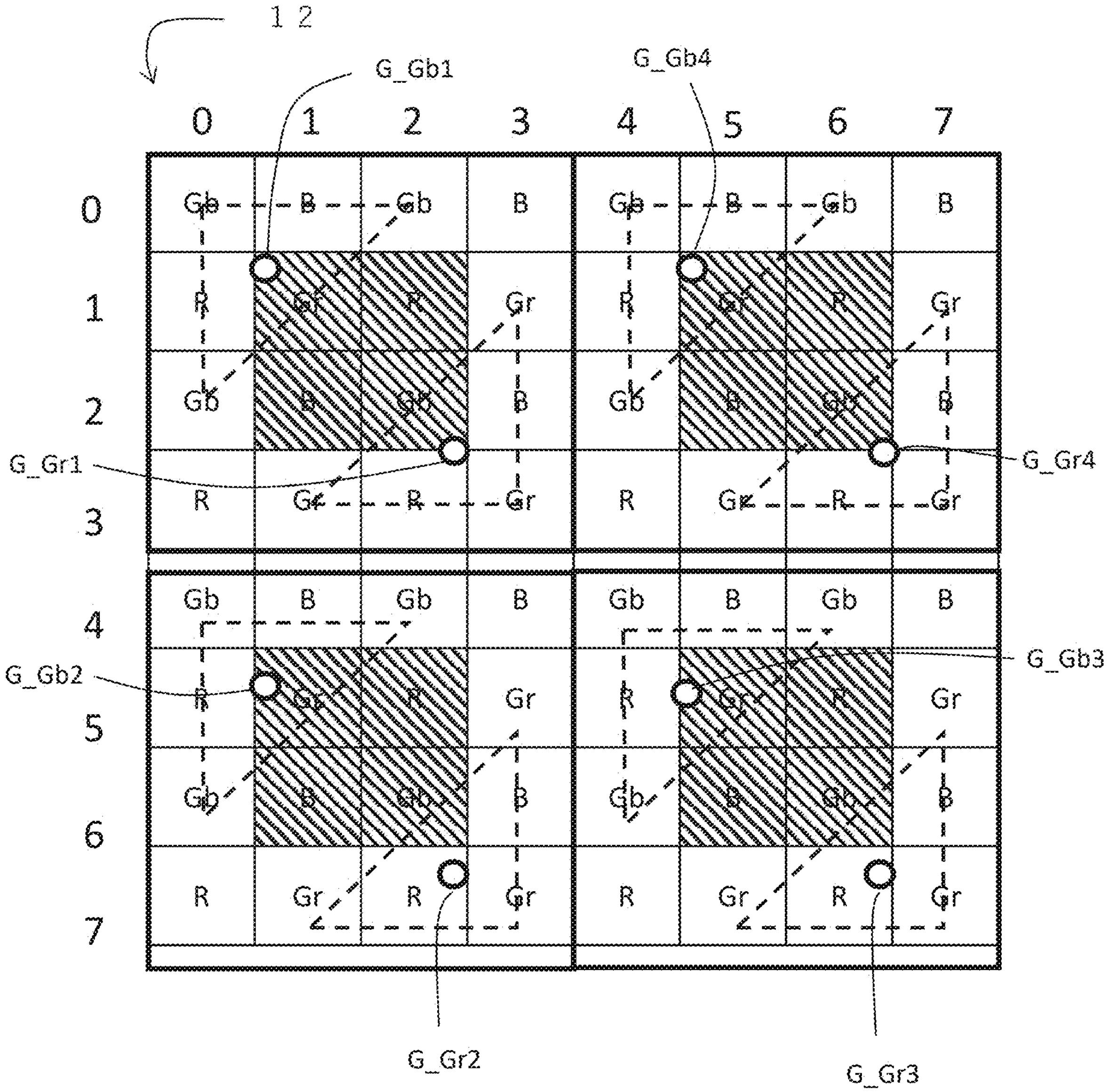
FIG. 4 is a diagram for explaining the uniform binning process (2/4)
Figure 5:
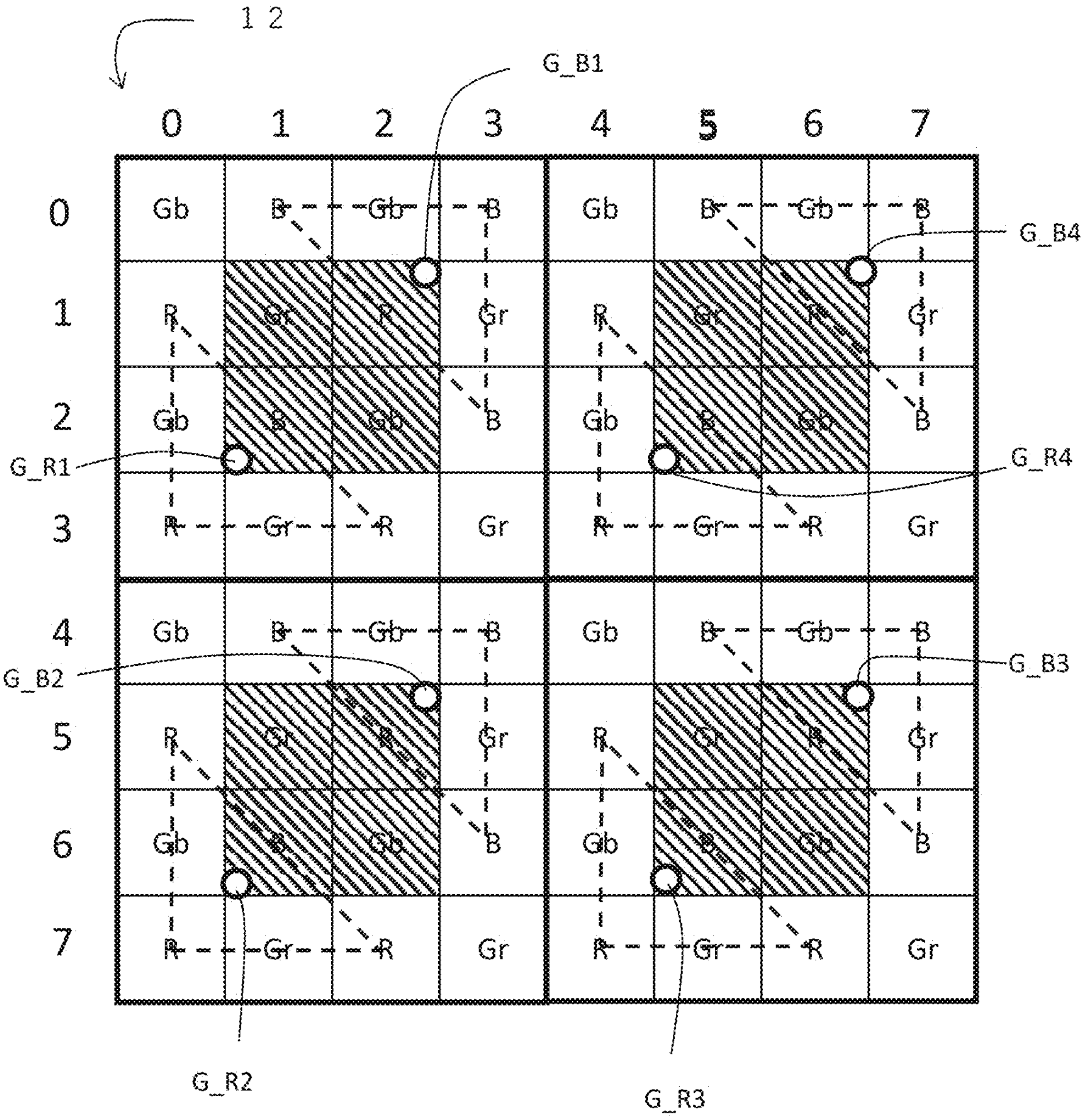
FIG. 5 is a diagram for explaining the uniform binning process (3/4)

That is, pixel signals shown with a hatching of slanted lines in FIG. 3 are not used for the binning process and are discarded. In such a uniform binning process, FIG. 4 shows geometric centers of gravity G_Gb1 to G_Gb4 of the Gb pixels, and geometric centers of gravity G_Gr1 to G_Gr4 of the Gr pixels. FIG. 5 shows geometric centers of gravity G_B1 to G_B4 of the B pixels, and geometric centers of gravity G_R1 to G_R4 of the R pixels.

As shown in FIGS. 4 and 5, in the (2×2) uniform binning process, in the pixel group, three pixels at an outer side are selected for each color. The geometric center of gravity is equivalent to a center of gravity of a triangle connecting centers of the three outer pixels.

Figure 6:
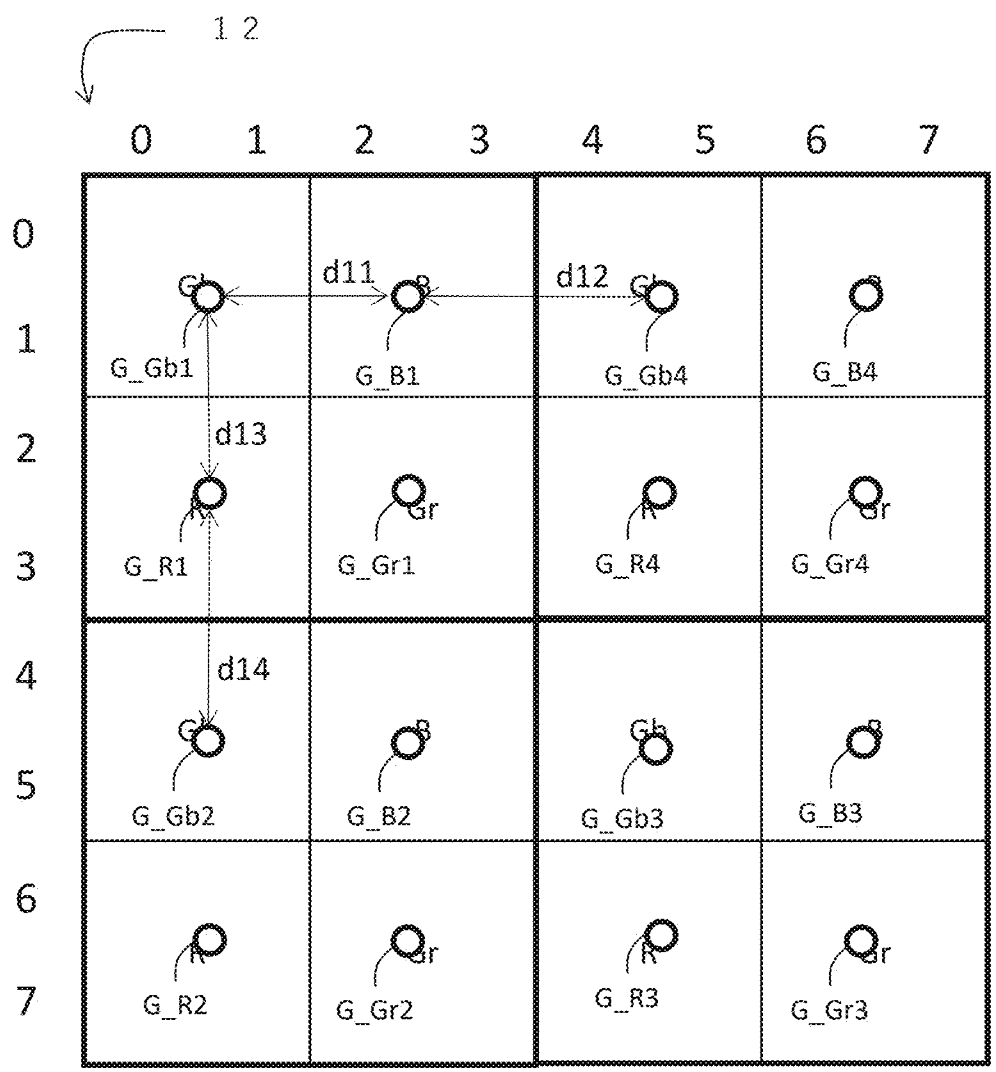
FIG. 6 is a diagram for explaining the uniform binning process (4/4)

FIG. 6 schematically shows a pixel arrangement after the uniform binning. Respective distances of the centers of gravity G_B1 to G_B4, G_R1 to G_R4, G_Gb1 to G_Gb4, and G_Gr1 to G_Gr4 theoretically expanded by the uniform binning process are more uniform in comparison with the binning process of the related art (normal binning process) as shown in FIG. 25.

Figure 25:
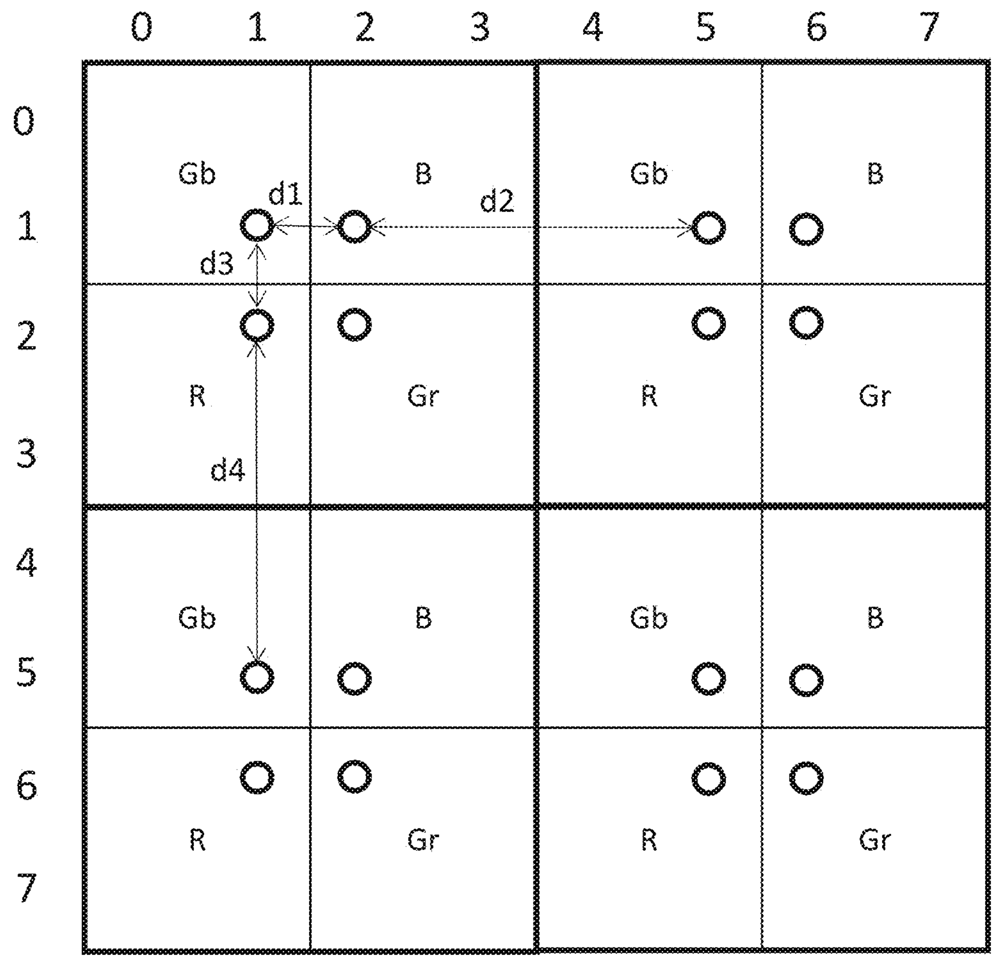
FIG. 25 is a diagram for explaining the binning process according to the related art (3/3).

For example, upon comparison of FIGS. 6 and 25, it can be understood that distances d11 and d13 between the centers of gravity within the pixel group after the uniform binning process are widened in comparison with the distances d1 and d3 between the centers of gravity within the pixel group after the normal binning process. Similarly, distances d12 and d14 between the centers of gravity between the pixel groups after the uniform binning process are shortened in comparison with the distances d2 and d4 between the centers of gravity between the pixel groups after the normal binning process.

Figure 7:
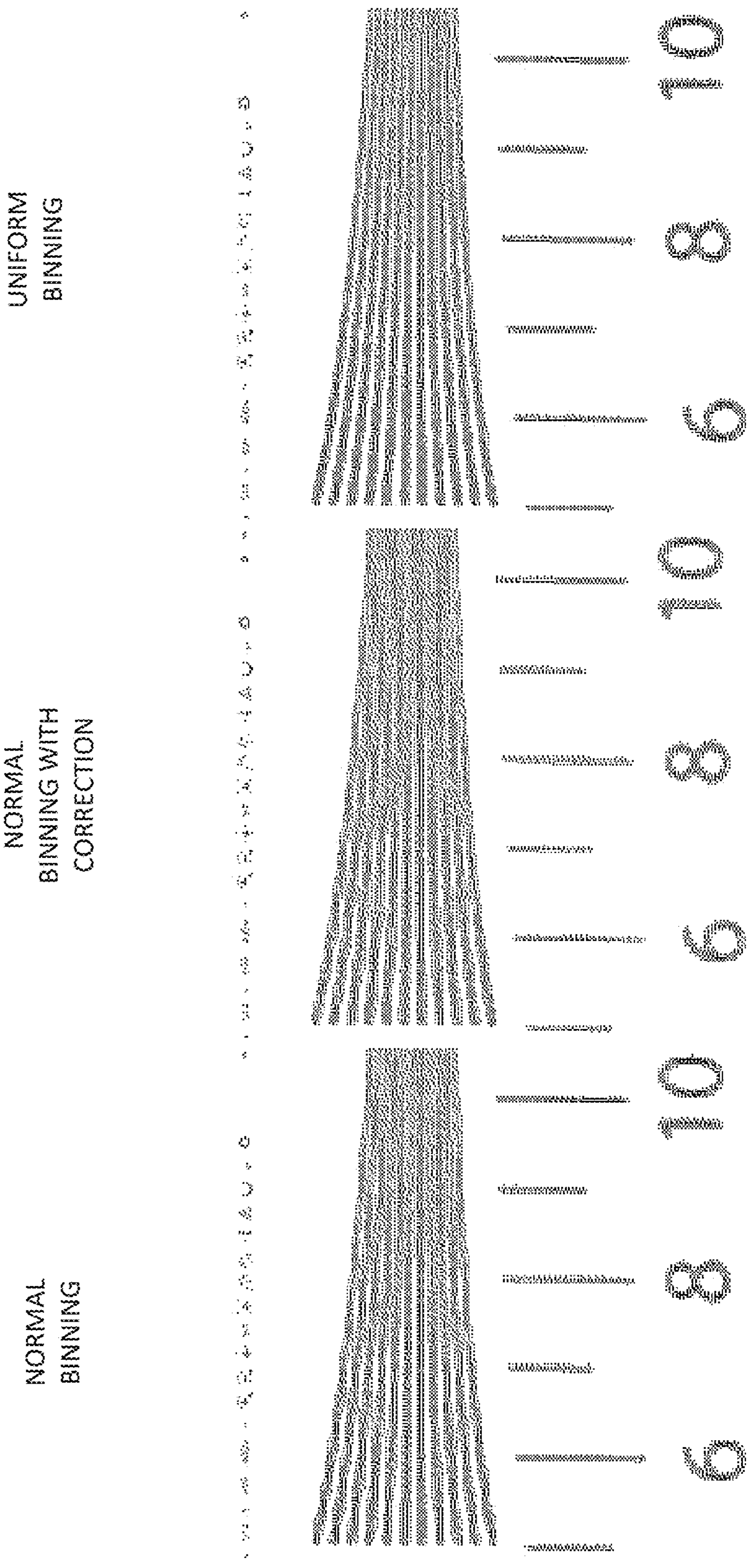
FIG. 7 is a diagram comparing an image acquired through the uniform binning process (horizontal line image) and an image acquired through the normal binning process of the related art.
Figure 8:
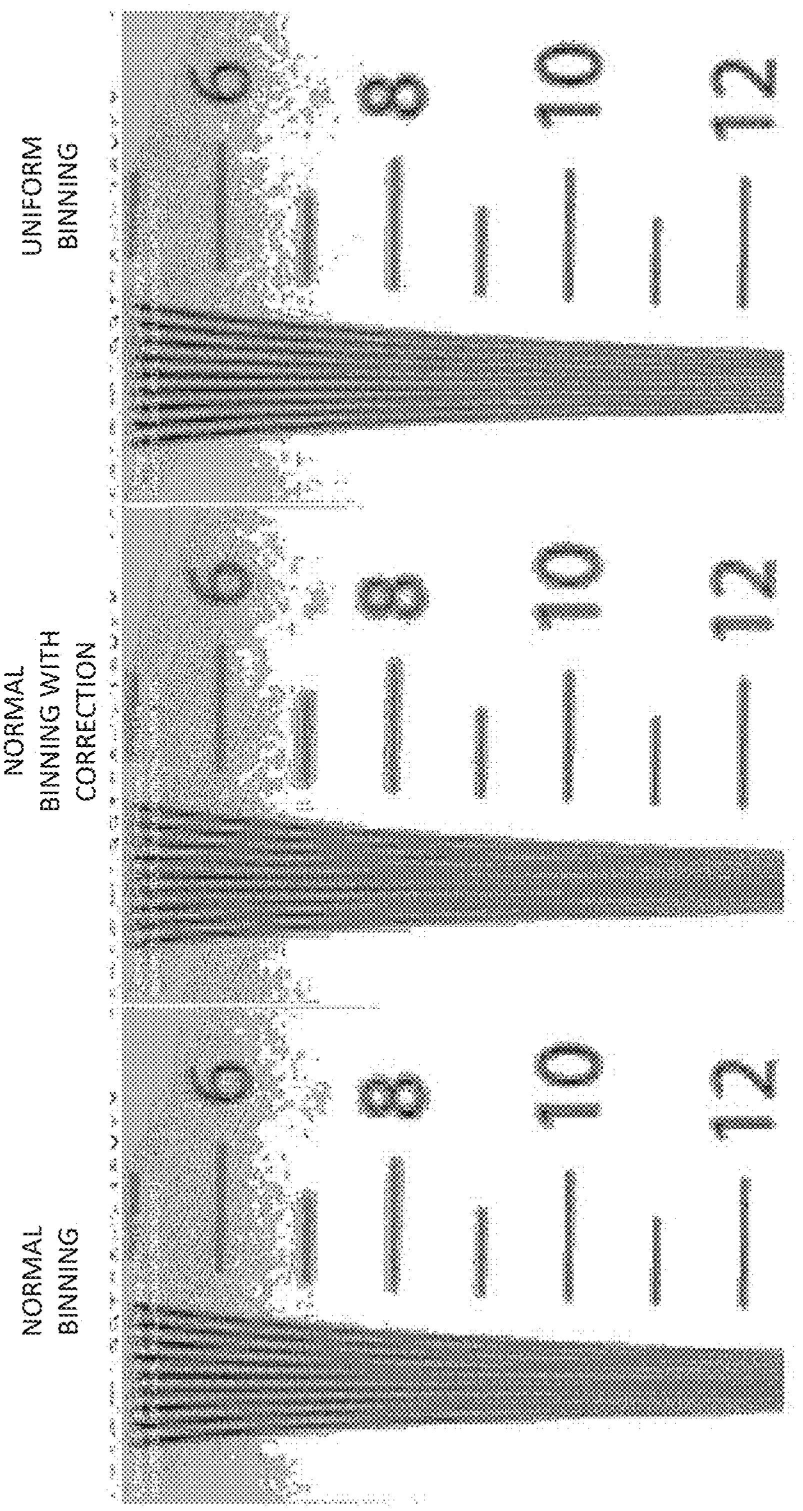
FIG. 8 is a diagram comparing an image acquired through the uniform binning process (vertical line image) and an image acquired through the normal binning process of the related art.

With the uniform placement of the centers of gravity of the pixels after the expansion as described, the artifact on the image can be suppressed. FIG. 7 exemplifies an image showing a bundle of lines extending primarily in a lateral direction. FIG. 8 exemplifies an image showing a bundle of lines extending primarily in a vertical direction. In these images, as a form of the artifact (disturbance of the image), drifting of a line image may be exemplified.

In both FIGS. 7 and 8, an image at the left of the drawing is an image through the normal binning process. An image at the center of the drawing is an image which is corrected after the normal binning process is executed by the image sensor. An image at the right of the drawing is an image through the uniform binning process. Upon comparison of these three images, it can be understood that the artifact is reduced in the image through the uniform binning process. In the image at the center of the drawing, weights are applied to target pixels after the normal binning process. For example, for the B pixels, in a (2×2) digital filtering process, correction is executed such that a value after the correction is $h_B=(49\times a+7\times b+7\times c+1\times d)/64$. Here, a pixel at upper left of the (2×2) pixel group is a pixel a, a pixel at upper right is a pixel b, a pixel at lower left is a pixel c, and a pixel at lower right is a pixel d. Similarly, for the Gb pixels, correction is executed such that a value after the correction is $h_{Gb}=(35\times a+21\times b+5\times c+3\times d)/64$. For the Gr pixels, correction is executed such that a value after the correction is $h_{Gr}=(35\times a+5\times b+21\times c+3\times d)/64$, and, for the R pixels, correction is executed such that a value after the correction is $h_R=(25\times a+15\times b+15\times c+9\times d)/64$.

With respect to the pixels which are targets of the uniform binning process, the binning processor 34 (refer to FIG. 1) averages or sums the respective pixel values. For example, with reference to FIG. 4, the binning processor 34 sums the respective pixel values of the Gb pixel (0, 0), the Gb pixel (2, 0), and the Gb pixel (0, 2). With the summation of the pixel values, the luminance value at the pixel after the expansion is increased. Alternatively, the binning processor 34 calculates an average value of the respective pixel values for the Gb pixel (0, 0), the Gb pixel (2, 0), and the Gb pixel (0, 2). With the calculation of the average value, noise in the pixel after the expansion is reduced.

Figure 9:
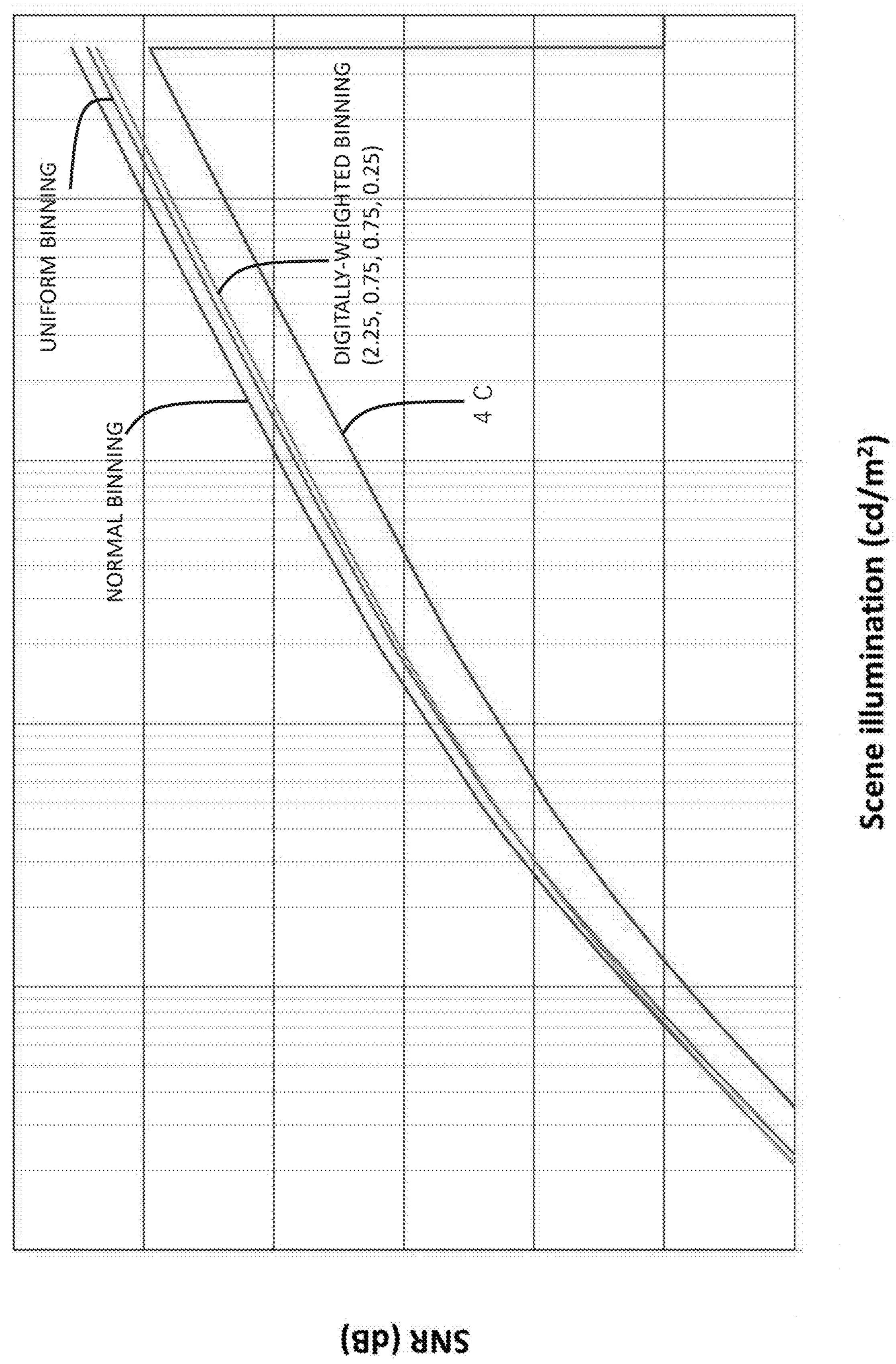
FIG. 9 is a diagram exemplifying an S/N ratio according to brightness (light intensity) of an imaging target in the uniform binning and other image processes.

As exemplified in FIG. 3, in the uniform binning process, a signal of at least one pixel is intentionally excluded from the processing target and discarded. Thus, in comparison with the case in which the signals of all pixels are used, there is a possibility that precision of averaging; that is, improvement capacity of the S/N ratio, is limited. FIG. 9 exemplifies the S/N ratio for each binning process. The horizontal axis shows light intensity [cd/m$^2$] of the imaging environment. On the horizontal axis, the light intensity is increased toward the right. The vertical axis shows the S/N ratio. On the vertical axis, the S/N ratio is improved toward the upper side.

In FIG. 9, characteristics curves are shown for four types of images. That is, FIG. 9 exemplifies the S/N ratios for images of four types including the image with the normal binning, the image with the uniform binning, the image with the digitally-weighted binning, and the image without the binning process (4C). In the digitally-weighted binning, with reference to FIG. 2, for the Gb pixels, a weight of 2.25 is multiplied by the pixel value at the coordinate (0, 0), and a weight of 0.75 is multiplied by the pixel values at the coordinates (0, 2) and (2, 0). Further, a weight of 0.25 is multiplied by the pixel value at the coordinate (2, 2).

With reference to the characteristic curves of FIG. 9, it can be understood that there is no significant difference in the S/N ratio between the normal binning and the uniform binning, in particular, in a dark environment.

As described, in the uniform binning process according to the present embodiment, a signal from at least one pixel of each color, disposed relatively closer to a center side of the pixel group, is excluded from the processing target. However, for processes other than the uniform binning process such as, for example, phase difference detection, or the like, the excluded pixel(s) may be utilized.

3. Circuit Structure Enabling Analog Uniform Binning

The uniform binning process according to the present embodiment can be executed by calculating the digital value after the A/D conversion. In addition, for the uniform binning process according to the present embodiment, a part of the process may be executed at a stage before the A/D conversion; that is, at an analog stage.

FIG. 10 exemplifies a circuit structure which enables analog uniform binning. In FIG. 10, numbers are assigned to the pixels in correspondence to the coordinate expression of FIG. 2. For example, a pixel Gb00 at an upper left corner of the drawing corresponds to the coordinate (0, 0); that is, the Gb pixel at the 0th row and 0th column. A pixel Gr77 at a lower right corner of the drawing corresponds to the Gr pixel at the coordinate (7, 7).

In this figure also, the pixels in the pixel array 12 are arranged based on the Bayer arrangement. That is, pixels of two colors are alternately arranged along the row direction. Further, pixels of two colors are alternately arranged along the column direction. For the convenience of illustration, Gb and Gr are treated as different colors.

Row selection lines extend from the horizontal scan circuit 16 into the pixel array 12. In the pixel array 12 of FIG. 10, two row selection lines are provided with respect to one row of pixels. For example, row selection lines RS1*a* and RS1*b* are provided with respect to a first pixel row. In this manner, row selection lines RSna and RSnb are provided with respect to an nth pixel row (wherein n is an integer).

A connection destination of the plurality of pixels of the pixel array 12 is switched between one row selection line RSna and the other row selection line RSnb every two pixels along the row direction. For example, with reference to the first row, pixels B10 and Gb20 are connected to the row selection line RS1*b*, and pixels B30 and Gb40 are connected to the row selection line RSla.

For one column of the pixels, the row selection line which is the connection destination is unified to one of the row selection line RSna and the row selection line RSnb. For example, all of the pixels of the first column are connected to the row selection line RSna (RS1*a*, RS2*a*, RS3*a*, RS4*a*, RS5*a*, RS6*a*, RS7*a*, RS8*a*).

4. Parallel Process Structure

The pixel array 12 exemplified in FIG. 10 is capable of simultaneously reading out the signals for a pixel group along the column direction. With reference to FIG. 10, for one column of the pixel array 12, four column signal lines are provided. That is, for a mth column of the pixel array 12 (wherein m is an integer), four column signal lines Cma, Cmb, Cmc, and Cmd are provided. To each of these column signal lines Cma, Cmb, Cmc, and Cmd, a CDS element and an ADC element of the CDS-ADC circuit 18 (refer to FIG. 1) are connected.

In the Bayer arrangement, color filters of two colors are alternately arranged along the column direction. For each color of the color filters of the two colors, a column signal line is assigned. For example, with regard to a pixel group A1 in FIG. 10, a pixel Gb00 and a pixel Gb02 are both connected to a column signal line C1*d*. Similarly, a pixel R01 and a pixel R03 are both connected to a column signal line C1*b*.

With regard to a pixel group A2 which forms a pair with the pixel group A1 along the column direction, a pixel Gb04 and a pixel Gb06 are both connected to a column signal line C1*c*, and a pixel R05 and a pixel R07 are both connected to a column signal line Cla.

In this manner, in the pixel array exemplified in FIG. 10, for each color of the color filters of two colors, a column signal line is assigned. In addition, for a pair of pixel groups along the column direction, the column signal line connected to one of the pixel groups and the column signal line connected to the other of the pixel groups differ from each other. That is, the column signal lines do not overlap in each color within the pixel group. Moreover, with regard to the pixel groups lined in the column direction also, the column signal lines do not overlap.

With such column signal lines and connection formats, as will be described later, it becomes possible to simultaneously read out signals for pixel groups along the column direction.

5. Analog Uniform Binning Process

Figure 11:
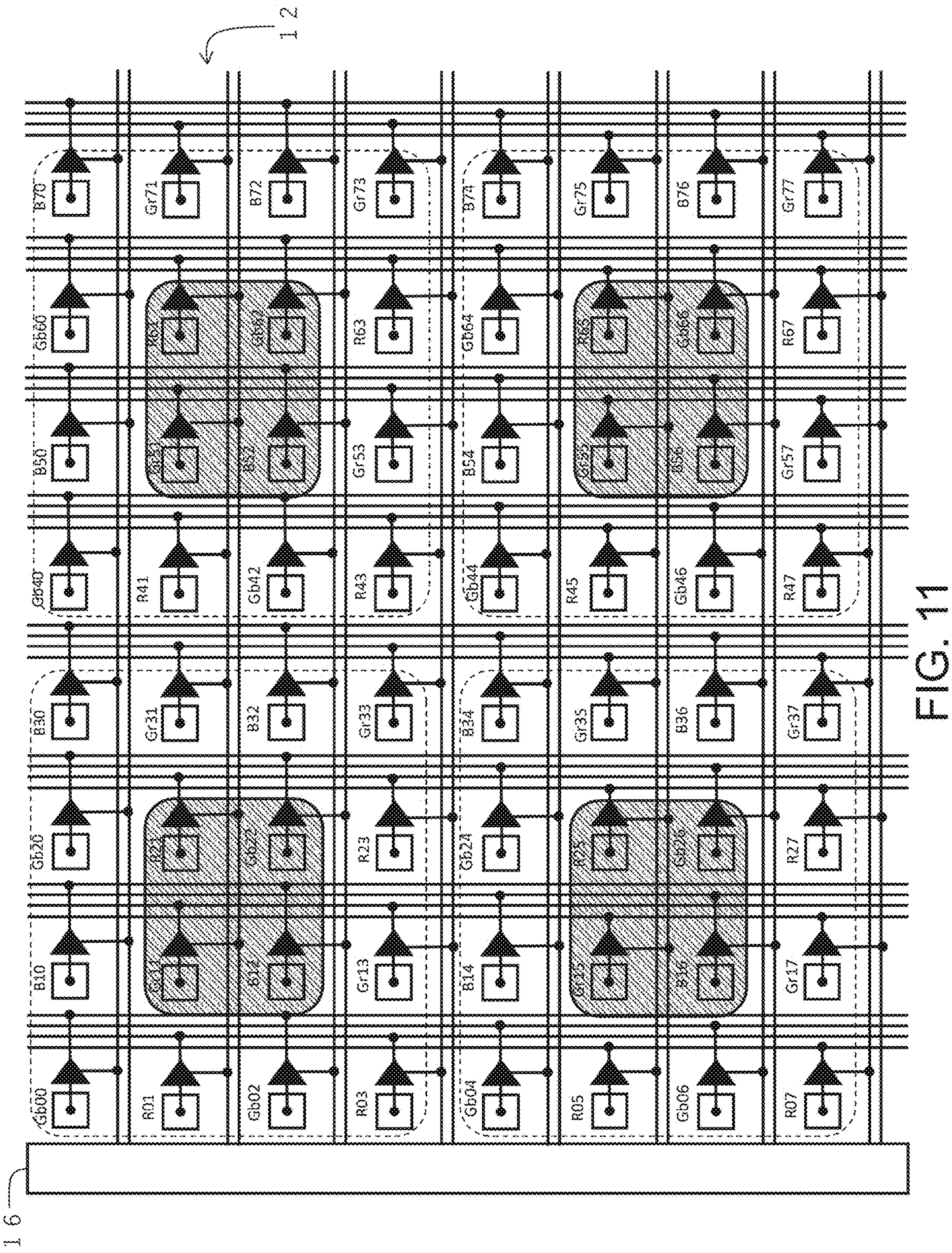
FIG. 11 is a diagram for explaining the uniform binning process using the pixel array according to the embodiment of the present disclosure (1/3)

FIG. 11 shows an overview of the uniform binning process. With reference to a quadrangular frame of a broken line of FIG. 11, similar to FIG. 3, the pixel group is divided into four. Further, a pixel disposed relatively closer to a center side of the pixel group is shown with a hatching of slanted lines. Signals of the pixels included in the hatching are excluded (discarded) in the uniform binning process.

Figure 12:
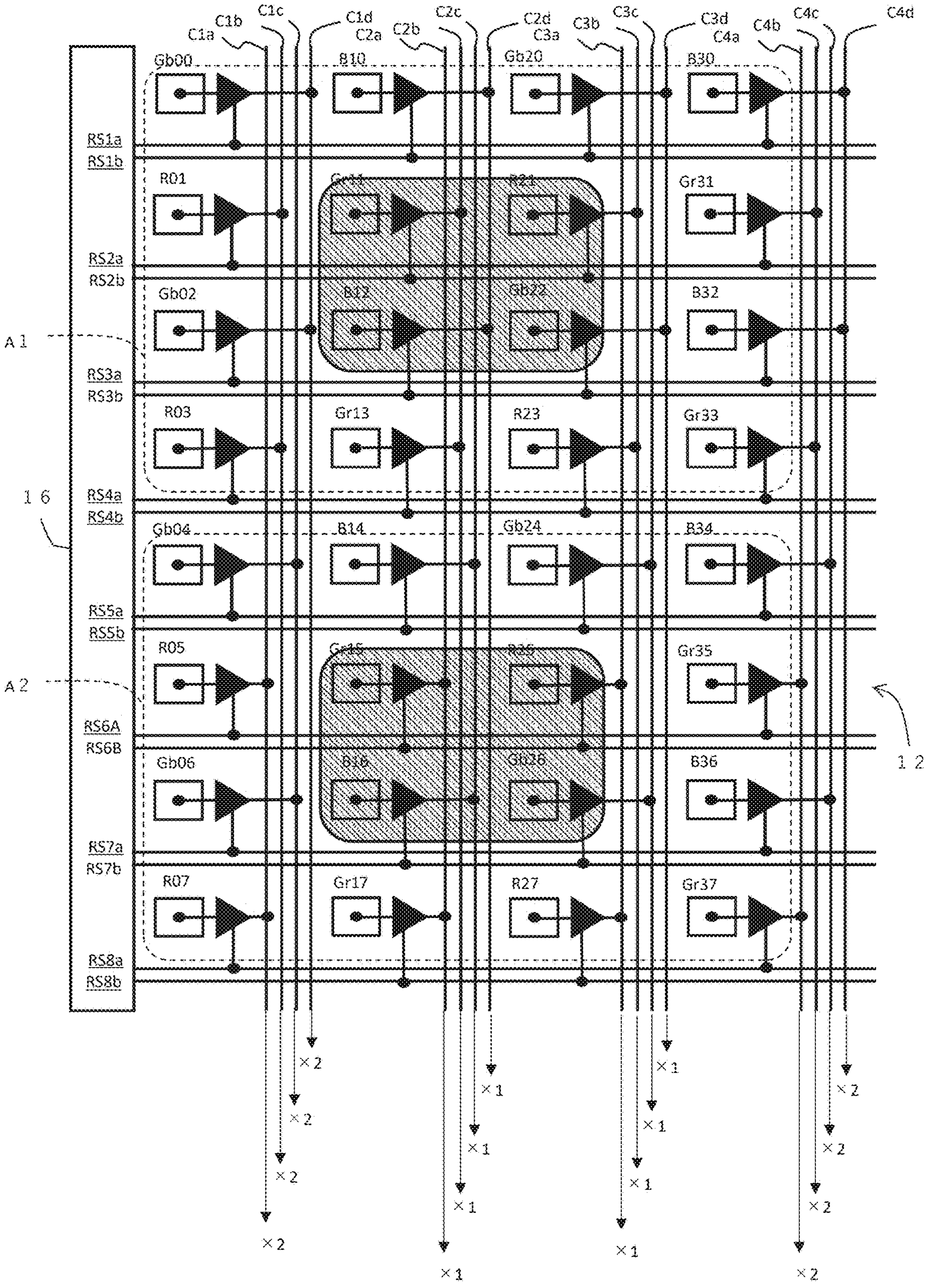
FIG. 12 is a diagram for explaining the uniform binning process using the pixel array according to the embodiment of the present disclosure (2/3)

FIG. 12 exemplifies a specific circuit operation. In FIG. 12, operations of the pixel groups A1 and A2 are exemplified. Due to the symmetry of the circuit, the remaining pixel groups are processed in a manner similar to the pixel groups A1 and A2.

In the uniform binning process, the binning processor 34 (refer to FIG. 1) commands a row selection line to be set to an ON state to the horizontal scan circuit. In FIG. 12, the row selection line to be operated ON is shown with an underline.

That is, for an upper row (first row) and a lower row (fourth row) of the pixel group A1, a set of row selection lines RS1*a*, RS1*b*, RS4*a*, and RS4*b* are set to the ON state. Further, for middle rows (second and third rows) of the pixel group A1, only row selection lines RS2*a* and RS3*a* are set to the ON state. With this configuration, signals of pixels Gr11, R21, B12, and Gb22 disposed at the center of the pixel group A1 are not read out.

Similarly, for an upper row (fifth row) and a lower row (eighth row) of the pixel group A2, a set of row selection lines RS5*a*, RS5*b*, RS8*a*, and RS8*b* are set to the ON state, and, for middle rows (sixth and seventh rows) of the pixel group A2, only row selection lines RS6*a* and RS7*a* are set to the ON state. With this configuration, signals of pixels Gr15, R25, B16, and Gb26 disposed at the center of the pixel group A2 are not read out.

When the normal binning process is to be executed in place of the uniform binning process, during the row readout, a pair of row selection lines RSna and RSnb (wherein n is an integer) are set to the ON state for all rows.

In the uniform binning process, as described above, the column signal lines C1*a*, C1*b*, C1*c*, and C1*d*, which are connection destinations of the pixel groups A1 and A2, do not overlap each other. Therefore, the reading out of the pixel groups A1 and A2 are simultaneously executed.

Looking at the first column, the signals of the pixel Gb00 and the pixel Gb02 are simultaneously sent to the column signal line C1*d*. Because the pixel signal is a voltage signal, and the pixel Gb00 and the pixel Gb02 are in a parallel arrangement with respect to each other on the circuit, an average voltage of the pixel Gb00 and the pixel Gb02 is output from the column signal line C1*d*. In other words, the averaging process of the pixel value is performed on the analog circuit. Similarly, when signals of pixels of the same color are simultaneously sent to one column signal line, an average value of the voltages of these pixels is output from the column signal line.

Looking at the second and third columns, a signal from one pixel is sent respectively to each column signal line.

The signal sent to the column signal line is transmitted to the CDS-ADC circuit 18 (refer to FIG. 1). A signal (pixel value) which is converted into the digital value through the CDS-ADC circuit 18 undergoes the uniform binning process by the binning processor 34.

Figure 13:
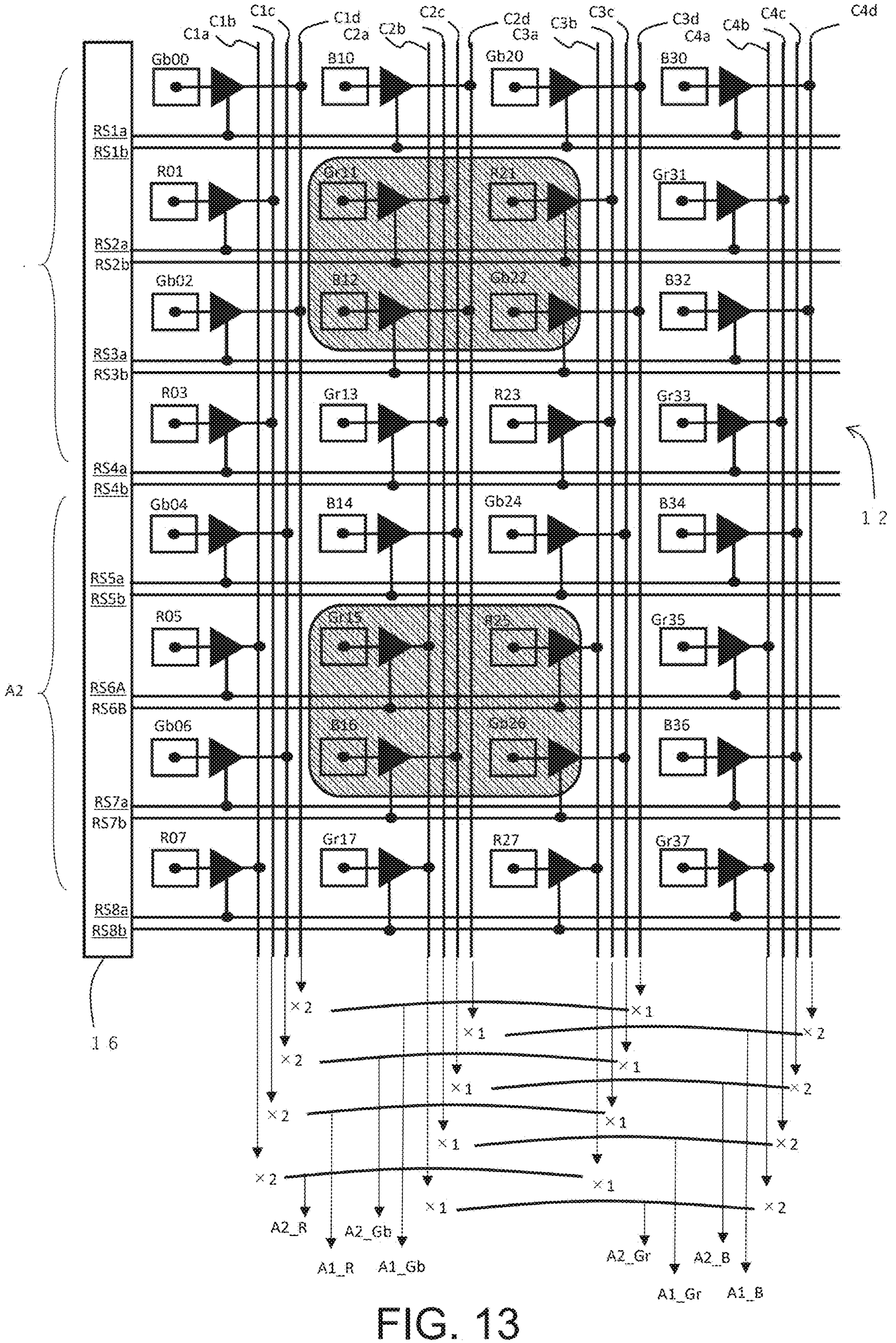
FIG. 13 is a diagram for explaining the uniform binning process using the pixel array according to the embodiment of the present disclosure (3/3)

For example, because signals (pixel values) which are output from the first column and the fourth column of the pixel array 12 respectively include signals from two pixels, the signal is multiplied by 2. Signals (pixel values) of the second and third columns of the pixel array 12 are processed with a multiplication factor of 1. For example, with reference to FIG. 13, with regard to the pixel group A1, the signal which is output from the column signal line C1*d* is doubled, while the signal which is output from the column signal line C3*d* is output with a multiplication factor of 1. These signals are summed, to form a value of a pixel A1_Gb expanded in the pixel group A1.

In this manner, in the summation process, the pixel values of the pixels of the same color within the pixel group are summed. On the other hand, in the averaging process, the value after the summation process is divided by the number of pixels (for example, 3 pixels including Gb00, Gb20, and Gb02) which are the binning processing targets, so that an average value is determined.

6. Uniform Binning Process During Video Image Capturing

Figure 14:
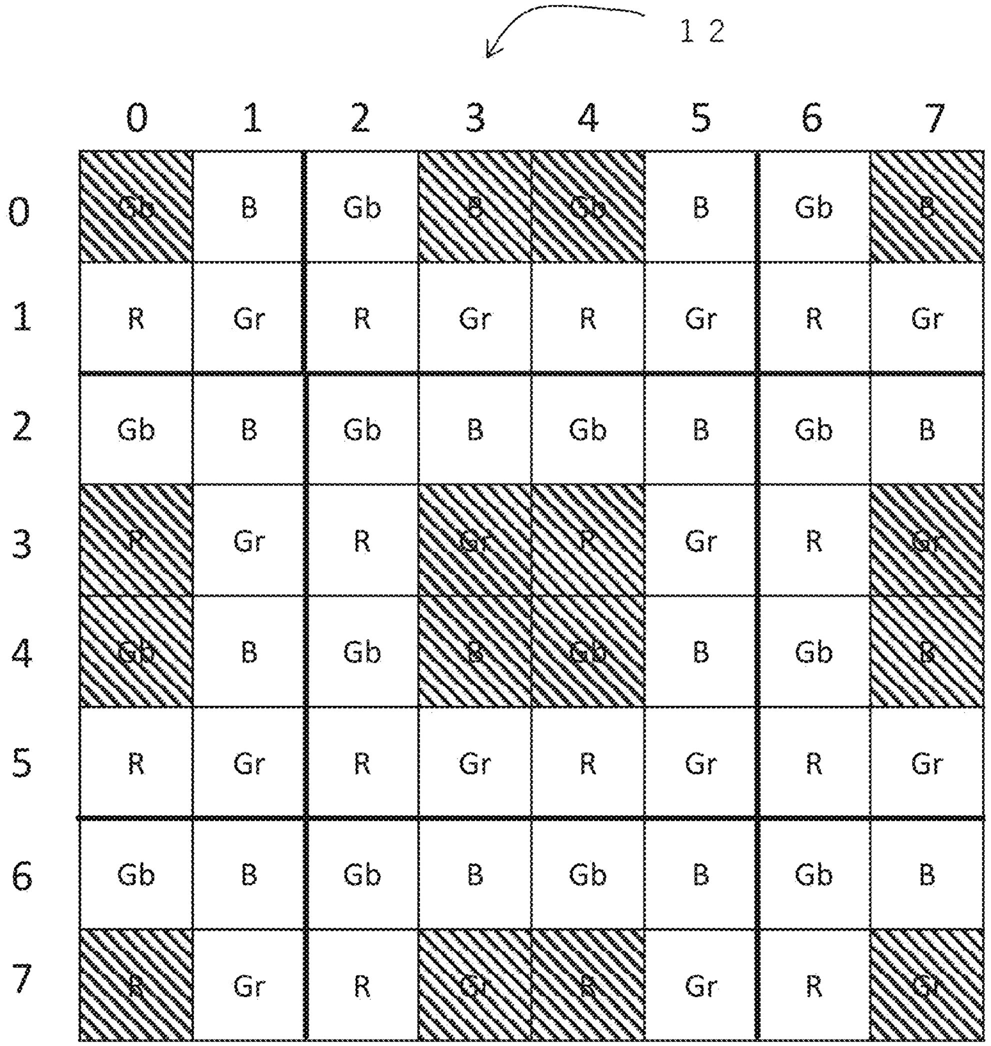
FIG. 14 is a diagram for explaining a group shift of the uniform binning.

An imaging apparatus according to the present embodiment may switch a block of the pixel group for each frame during a video image capturing. FIG. 3 exemplifies a pixel group in a predetermined frame. FIG. 14 exemplifies a pixel group at a subsequent frame.

Comparing FIGS. 3 and 14, the binning processor 34 (refer to FIG. 1) sets the pixel groups in such a manner that non-used pixels (pixels for which the signals are discarded) are complementary. For example, in FIG. 14, the pixel groups are set in a state of being shifted from the pixel groups of FIG. 3 by two rows in the row direction and two columns in the column direction. With the groupings of FIGS. 3 and 14 being alternately employed, the artifact can be visually reduced.

Figure 15:
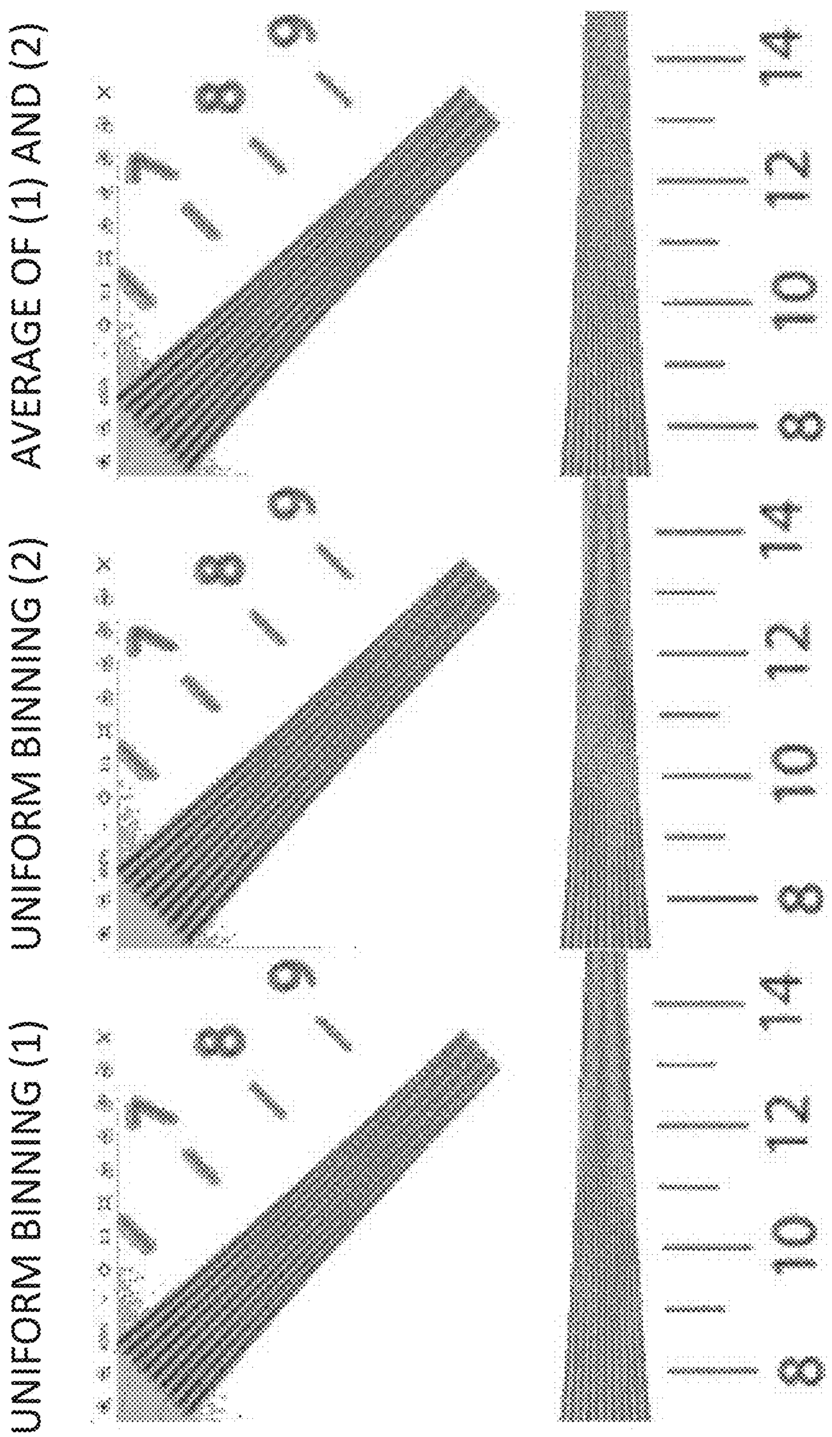
FIG. 15 is a diagram for explaining a visual effect when the group shift is executed.

FIG. 15 exemplifies an image to which the uniform binning process is applied in a predetermined frame (that is, based on FIG. 3) (at the left of the figure), and an image to which the uniform binning process is applied in a subsequent frame (that is, based on FIG. 14) (at the center of the figure). As is clear in particular from an image at a lower side, with the groupings of the pixels being different between the frames, a location of occurrence of the artifact becomes complementary. For example, an advantage can be obtained in which, even when an artifact occurs at a certain location of one image, no artifact occurs at this location of the other image. Therefore, in a video image in which these images are consecutively displayed, the artifact is visually reduced, as shown at the right of the figure.

7. Uniform Binning Process Based on Foveated Rendering

In general, whether or not the binning process is to be executed is determined based on lightness/darkness of the pixel value. In addition to this, the uniform binning process and the normal binning process may be executed based on so-called foveated rendering.

With reference to FIG. 1, the imaging system includes the eye tracking mechanism 45. The eye tracking mechanism 45 traces a line of sight of the user viewing the image displayed on the display device 40. For example, the eye tracking mechanism 45 includes a near-infrared light source and a camera. That is, with the eye tracking mechanism 45, so-called non-contact type eye tracking is executed.

With the eye tracking mechanism 45, a point of gaze of the user is specified. The binning processor 34 executes the uniform binning process with respect to a region outside the point of gaze. For example, the binning processor 34 executes the uniform binning process even with respect to the pixel having a brightness exceeding the threshold as described above. In other words, by intentionally reducing the resolution of the image in regions other than the point of gaze, calculation load related to the image display can be reduced.

Figure 16:
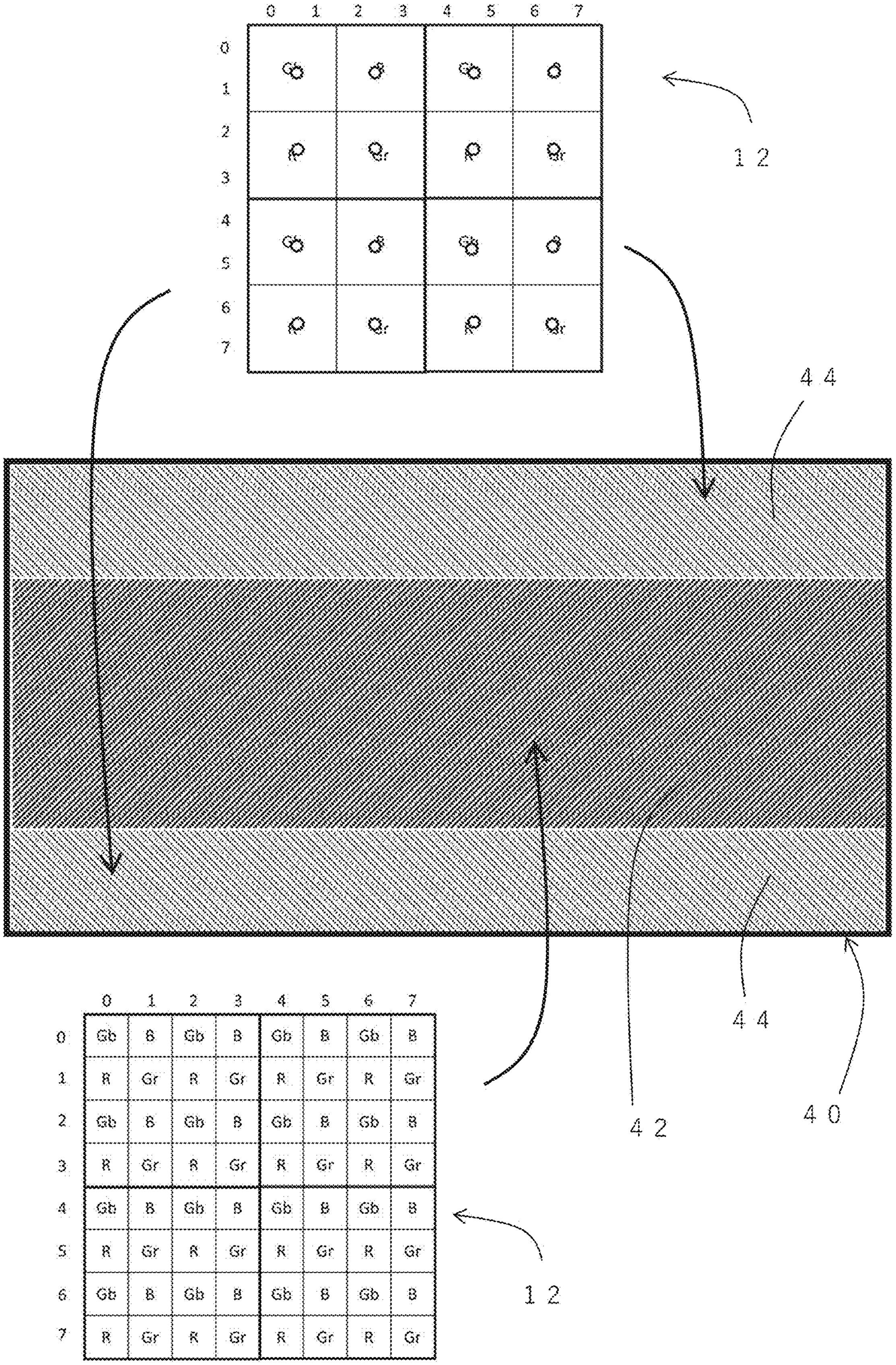
FIG. 16 is a diagram exemplifying a range to which the uniform binning process is applied in an image process based on foveated rendering.

With reference to FIG. 16, for example, when a center part in a height direction of an image displayed on the display device 40 is a gaze region 42, regions above and below the gaze region 42 are non-gaze regions 44. The binning processor 34 executes the uniform binning process with respect to the pixels corresponding to the non-gaze regions 44

8. (3×3) Binning

In the embodiment described above, the (2×2) binning process is exemplified as the (k×k) binning process. However, the binning processor 34 according to the present embodiment can also execute other binning processes.

Figure 17:
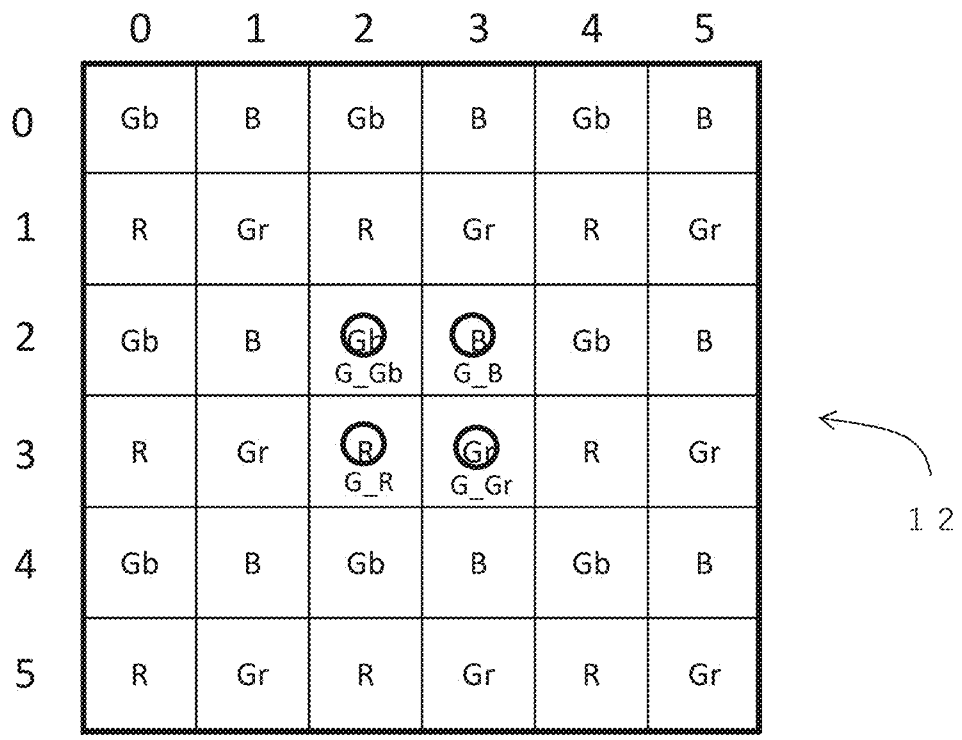
FIG. 17 is a diagram for explaining a (3×3) normal binning.

FIG. 17 shows a (3×3) normal binning process. In this example configuration, for each color, three pixels are selected both vertically and horizontally. The size of the pixel group is (6×6). Centers of gravity G_Gb, G_B, G_R, and G_Gr of the expanded pixels after the normal binning process are shown in FIG. 17. As shown in FIG. 17, the centers of gravity G_Gb, G_B, G_R, and G_Gr are disposed unevenly, near the center of the pixel group.

Figure 18:
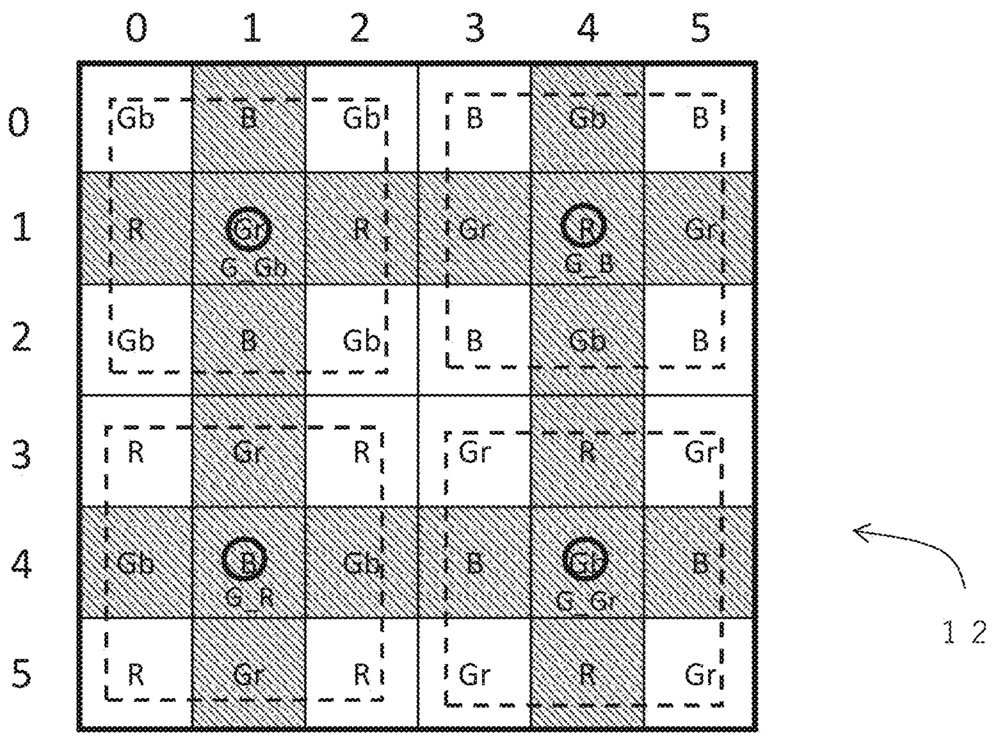
FIG. 18 is a diagram for explaining a (3×3) uniform binning.

FIG. 18 shows an example of a (3×3) uniform binning process. In this example configuration also, a signal from at least one pixel of each color, disposed relatively closer to a center side of the pixel group, is excluded from the processing target (is not used). For example, for the Gb pixels, pixels at coordinates (4, 0), (0, 4), (4, 2), (2, 4), and (4, 4) are non-used pixels. Similarly, for the B pixels, pixels at coordinates (1, 0), (1, 2), (1, 4), (3, 4), and (5, 4) are non-used pixels, for the R pixels, pixels at coordinates (0, 1), (2, 1), (4, 1), (4, 3), and (4, 5) are non-used pixels, and, for the Gr pixels, pixels at coordinates (1, 1), (3, 1), (5, 1), (1, 3), and (1, 5) are non-sued pixels. Through such a uniform binning process, as shown by the centers of gravity G_Gb, G_B, G_R, and G_Gr, the centers of gravity of the respective colors are more uniformly distributed in comparison with the centers of gravity of the normal binning process (refer to FIG. 17).

Figure 19:
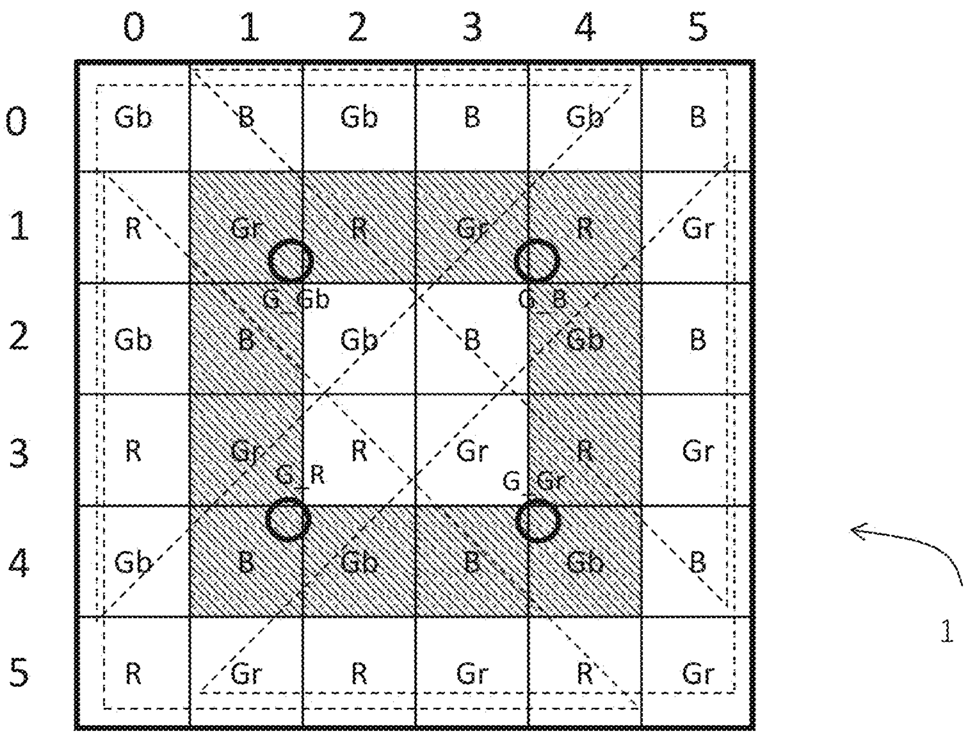
FIG. 19 is a diagram for explaining the (3×3) uniform binning when non-used pixels are changed from FIG. 18.

FIG. 19 shows an example configuration with a selection of the non-used pixels different from FIG. 18. In this example configuration, the pixels at the coordinates (1, 0), (4, 0), (0, 1), (5, 1), (0, 4), (5, 4), (1, 5), and (4, 5), which are set as the non-used pixels in the example configuration of FIG. 18, are targets of the binning process (those pixels are pixels which are used).

With this configuration, in the example configuration of FIG. 19, the centers of gravity of the respective colors are shifted toward the center in comparison with FIG. 18, but are more uniformly distributed in comparison with the normal binning process shown in FIG. 17. In addition, because the number of signals to be discarded in the example configuration of FIG. 19 is smaller in comparison with that in FIG. 18, a greater advantage can be expected for the summation and the averaging by the binning process.

9. (4×4) Binning

Figure 20:
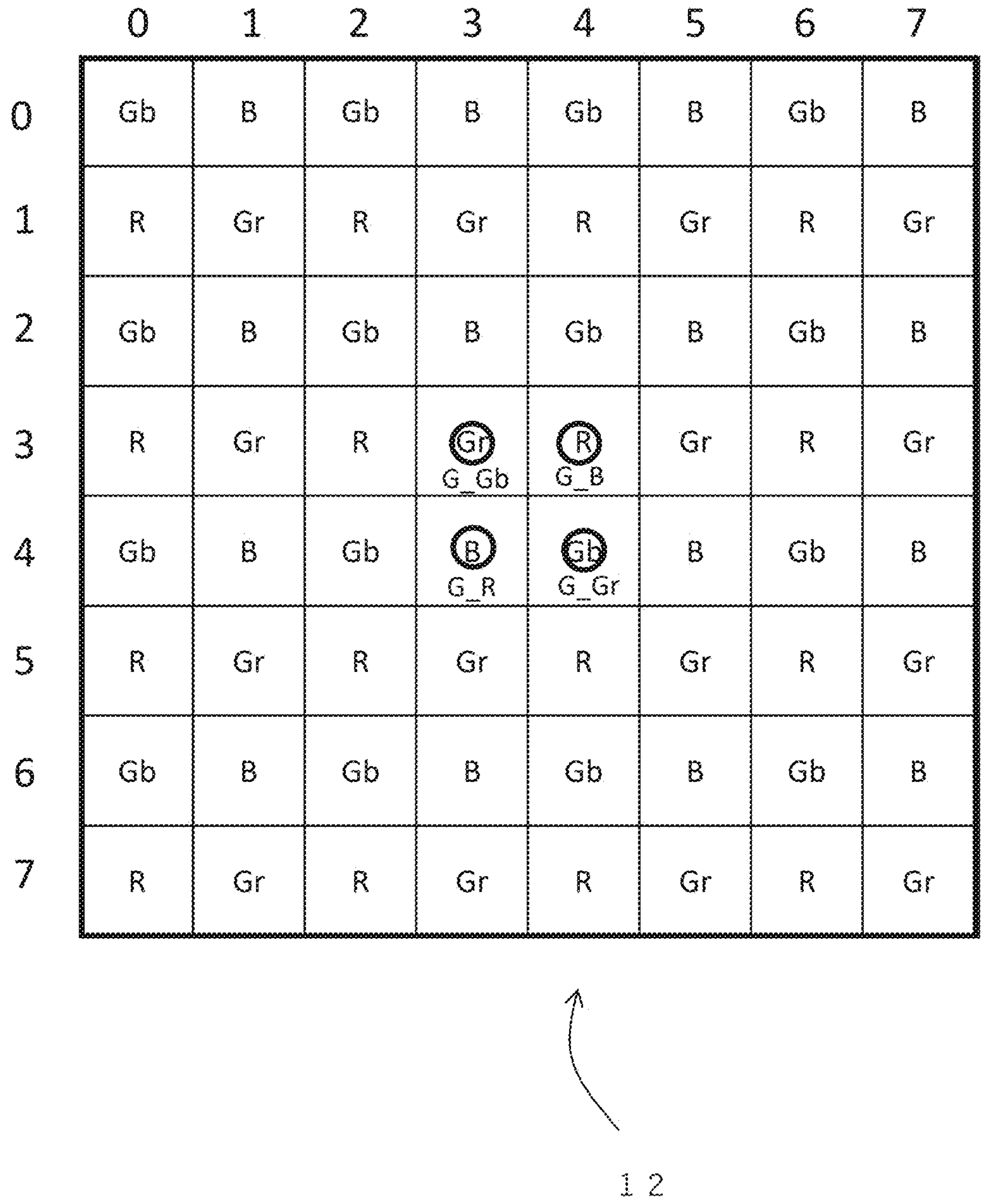
FIG. 20 is a diagram for explaining a (4×4) normal binning.

FIG. 20 shows a (4×4) normal binning process. In this example configuration, for each color, four pixels are selected both vertically and horizontally. The size of the pixel group is (8×8). Centers of gravity G_Gb. G_B, G_R, and G_Gr of the expanded pixels after the normal binning process are exemplified in FIG. 20. As shown in FIG. 20, the centers of gravity G_Gb, G_B, G_R. and G_Gr are disposed unevenly, near the center of the pixel group.

Figure 21:
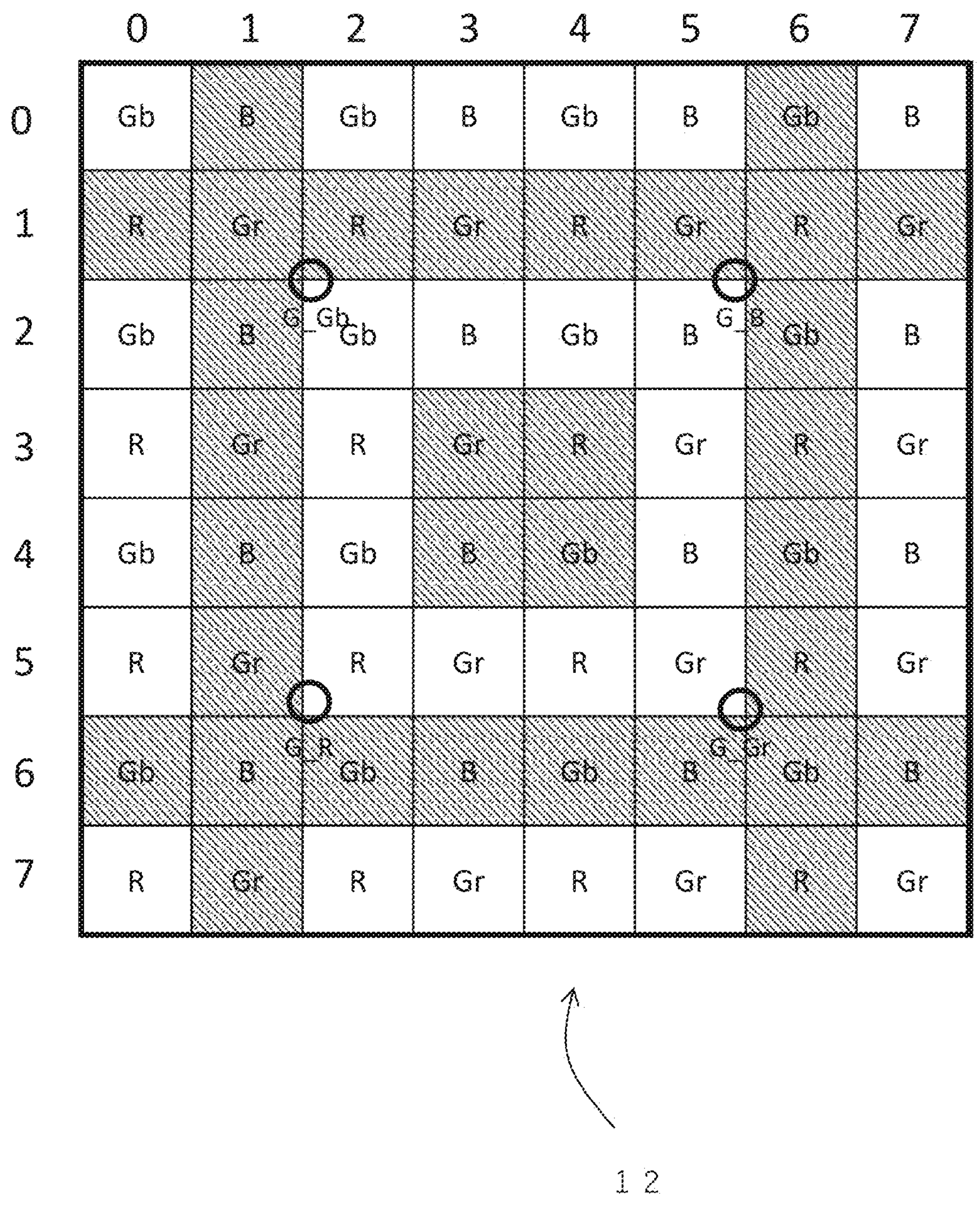
FIG. 21 is a diagram for explaining a (4×4) uniform binning.

FIG. 21 shows an example configuration of a (4×4) uniform binning process. In this example configuration also, a signal from at least one pixel of each color, disposed relatively closer to a center side of the pixel group, is excluded from the processing target (the pixel is not used). For example, for the Gb pixels, pixels at coordinates (6, 0), (6, 2), (4, 4), (6, 4), (0, 6), (2, 6), (4, 6), and (6, 6) are non-used pixels. Similarly, for the B pixels, pixels at coordinates (1, 0), (1, 2), (1, 4), (3, 4), (1, 6), (3, 6), (5, 6), and (7, 6) are non-used pixels, for the R pixels, pixels at coordinates (0, 1), (2, 1), (4, 1), (6, 1), (4, 3), (6, 3), (6, 5), and (6, 7) are non-used pixels, and, for the Gr pixels, pixels at coordinates (1, 1), (3, 1), (5, 1), (7, 1), (1, 3), (3, 3), (1, 5), and (1, 7) are non-used pixels. With such a uniform binning process, as shown by the centers of gravity G_Gb, G_B, G_R, and G_Gr, the centers of gravity of the respective colors are more uniformly distributed in comparison with the centers of gravity of the normal binning process (refer to FIG. 20).

Figure 22:
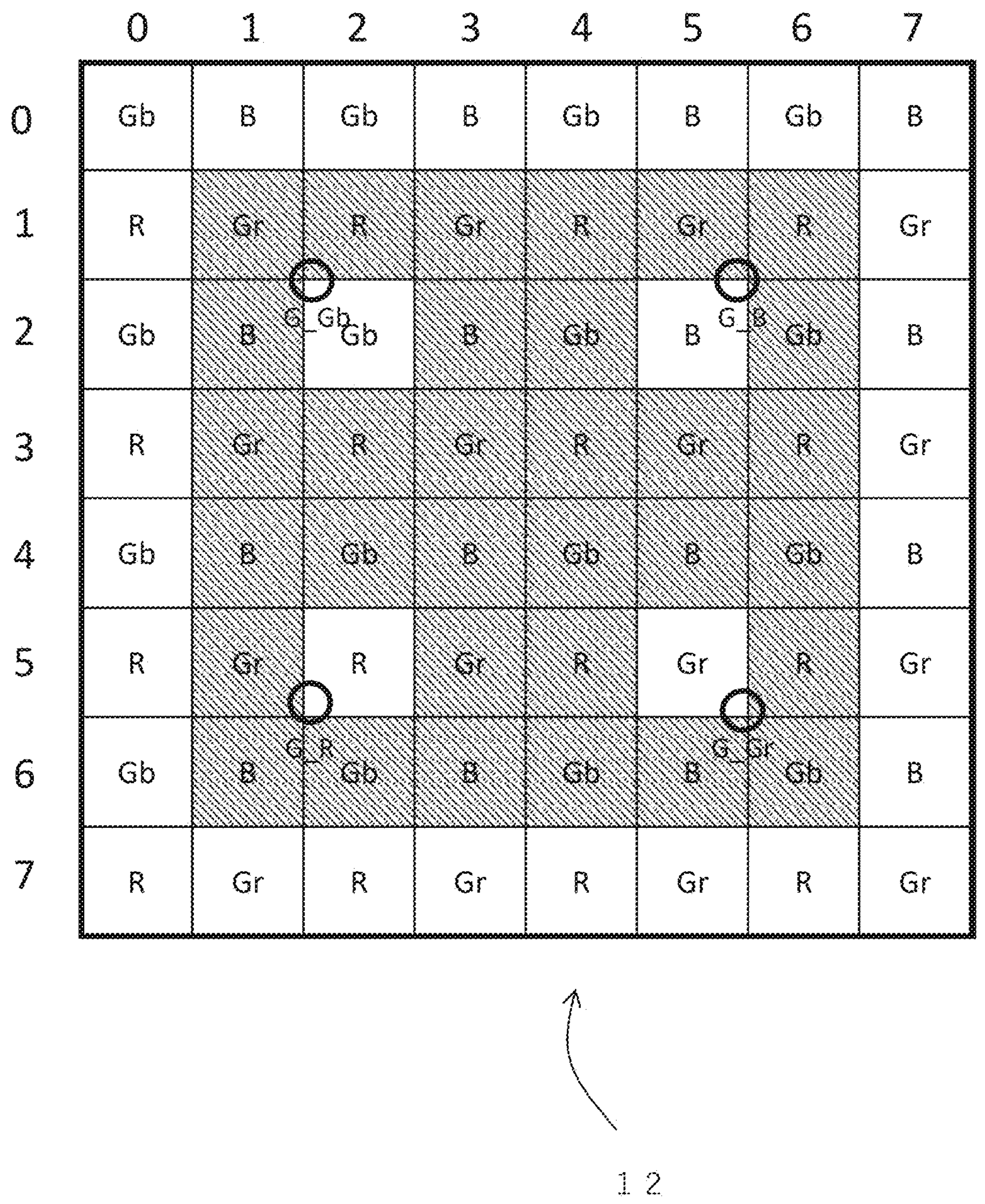
FIG. 22 is a diagram for explaining the (4×4) uniform binning when non-used pixels are changed from FIG. 21.

FIG. 22 shows an example configuration with a selection of the non-used pixels different from that of FIG. 21. In this example configuration, the pixels at coordinates (1, 0), (6, 0), (0, 1), (7, 1), (0, 6), (7, 6), (1, 7), and (6, 7), which are non-used pixels in the example configuration of FIG. 21, are targets of the binning process (these pixels are pixels which are used). On the other hand, pixels at coordinates (2, 3), (5, 3), (2, 4), and (5, 4), which are used pixels in the example configuration of FIG. 21, are non-used pixels.

With this configuration, in the example configuration of FIG. 22, the centers of gravity of the respective colors are distributed to a degree similar to that of FIG. 21. In addition, because the number of signals which are discarded in FIG. 22 is smaller in comparison with that in FIG. 21, a greater advantage can be expected for the summation and the averaging by the binning process.

The present disclosure is not limited to the present embodiments described above, and includes all changes and modifications without departing from the technical scope or the essence of the present disclosure defined by the claims.

The invention claimed is:

1. An imaging apparatus comprising:
a pixel array in which a plurality of pixels are two-dimensionally arranged;
a color filter array disposed over the pixel array, and in which R color filters, G color filters, and B color filters are arranged in Bayer arrangement; and
a binning processor configured to execute a (k×k) binning process treating k pixels in a vertical direction and k pixels in a horizontal direction in the pixel array as one pixel group, wherein k is an integer, wherein
the binning processor is capable of executing a uniform binning process in which a signal from at least one pixel of each color, disposed relatively closer to a center side of the pixel group, is excluded from a processing target.

2. The imaging apparatus according to claim 1, wherein
the binning processor is capable of switching between a normal binning process which uses signals from all of the pixels of the pixel group, and the uniform binning process.

3. The imaging apparatus according to claim 1, wherein
the binning processor is configured to execute a (2×2) binning process,
two row selection lines are provided with respect to one row of the pixel array, and
a connection destination of the plurality of pixels of the pixel array is switched between one of the row selection lines and the other of the row selection lines every two pixels along a row direction.

4. The imaging apparatus according to claim 3, wherein
four column signal lines are provided with respect to one column of the pixel array,
in the color filter array, color filters of two colors are alternately arranged along a column direction,
the column signal line is assigned to each color of the color filters of two colors, and
for a pair of the pixel groups along the column direction, the column signal line connected to one of the pair of pixel groups and the column signal line connected to the other of the pair of pixel groups differ from each other.

5. The imaging apparatus according to claim 1, wherein
during a video image capturing, the binning processor is configured to two-dimensionally shift the plurality of pixels to be grouped between the pixel group in a predetermined frame and the pixel group in a subsequent frame.

6. The imaging apparatus according to claim 1, further comprising:
a display on which an image by the pixel array is displayed; and
an eye tracking mechanism that measures a line of sight directed to the display, wherein
the binning processor is configured to execute the binning process with respect to a region outside of a point of gaze of the line of sight.

7. An imaging method executed in an imaging apparatus, the imaging apparatus comprising:
a pixel array in which a plurality of pixels are two-dimensionally arranged; and
a color filter array disposed over the pixel array, and in which R color filters, G color filters, and B color filters are arranged in Bayer arrangement,
the method comprising:
executing a (k×k) binning process treating k pixels in a vertical direction and k pixels in a horizontal direction in the pixel array as one pixel group, wherein k is an integer; and
executing a uniform binning process as the binning process, in which a signal from at least one pixel of each color, disposed relatively closer to a center side of the pixel group, is excluded from a processing target.

8. The imaging method according to claim 7, wherein
the binning process can be switched between a normal binning process which uses signals from all of the pixels of the pixel group, and the uniform binning process.

9. The imaging method according to claim 7, wherein
during a video image capturing, the plurality of pixels to be grouped are two-dimensionally shifted between the pixel group in a predetermined frame and the pixel group in a subsequent frame.

10. The imaging method according to claim 7, wherein
the imaging apparatus further comprises:
a display on which an image by the pixel array is displayed; and
an eye tracking mechanism which measures a line of sight directed to the display, and
the binning process is executed with respect to a region outside of a point of gaze of the line of sight.

* * * * *